US012377542B2

(12) United States Patent
Zamora Esquivel et al.

(10) Patent No.: US 12,377,542 B2
(45) Date of Patent: Aug. 5, 2025

(54) GEOMETRIC ROBOTIC PLATFORM

(71) Applicant: Intel Corporation, Santa Clara, CA (US)

(72) Inventors: Julio Zamora Esquivel, Zapopan (MX); Fernando Jimenez Aguilar, Girasoles Aceuducto (MX)

(73) Assignee: Intel Corporation, Santa Clara, CA (US)

( * ) Notice: Subject to any disclaimer, the term of this patent is extended or adjusted under 35 U.S.C. 154(b) by 895 days.

(21) Appl. No.: 17/358,741

(22) Filed: Jun. 25, 2021

(65) Prior Publication Data

US 2021/0316456 A1    Oct. 14, 2021

(51) Int. Cl.
| | |
|---|---|
| *B25J 9/16* | (2006.01) |
| *B25J 9/00* | (2006.01) |
| *B25J 19/02* | (2006.01) |
| *B62D 57/02* | (2006.01) |
| *G06T 7/50* | (2017.01) |
| *G06T 17/00* | (2006.01) |

(52) U.S. Cl.
CPC ........... *B25J 9/1666* (2013.01); *B25J 9/0009* (2013.01); *B25J 19/023* (2013.01); *B62D 57/02* (2013.01); *G06T 7/50* (2017.01); *G06T 17/00* (2013.01)

(58) Field of Classification Search
CPC ...... B25J 9/1666; B25J 9/0009; B25J 19/023; B62D 57/02; G06T 7/50; G06T 17/00
See application file for complete search history.

(56) References Cited

U.S. PATENT DOCUMENTS

| 11,017,539 | B2 * | 5/2021 | Carranza | G06V 20/52 |
|---|---|---|---|---|
| 11,738,445 | B2 * | 8/2023 | Mhd | B25J 9/1689 |
| | | | | 700/264 |
| 2004/0155877 | A1 * | 8/2004 | Hong | G06T 7/11 |
| | | | | 345/419 |
| 2006/0090938 | A1 * | 5/2006 | Tanielian | B62D 57/02 |
| | | | | 180/8.1 |

(Continued)

FOREIGN PATENT DOCUMENTS

| AU | 2012201317 | B1 * | 7/2013 | ............ A63H 11/02 |
|---|---|---|---|---|
| CN | 105894573 | A * | 8/2016 | |

(Continued)

OTHER PUBLICATIONS

Evaluation_of_MRI_compatible_pneumatic_muscle_stepper_motors (Year: 2019).*

(Continued)

*Primary Examiner* — Kyle T Johnson
(74) *Attorney, Agent, or Firm* — Schwegman Lundberg & Woessner, P.A.

(57) ABSTRACT

Various aspects of methods, systems, and use cases include a robotic system and control or use of the robotic system. A method for autonomous movement of the robotic system may include receiving a target location, identifying robotic components of the robotic system that are in contact with a surface, and determining a robotic component of the robotic components to activate to cause the robotic system to move closer to the target location. The method may include activating, based on the determination, a motor of the robotic component to push against the surface to cause the robotic system to move towards the target location.

25 Claims, 14 Drawing Sheets

(56) References Cited

U.S. PATENT DOCUMENTS

| | | | | |
|---|---|---|---|---|
| 2008/0083571 | A1* | 4/2008 | Troy | B62D 57/00 |
| | | | | 180/7.1 |
| 2011/0231050 | A1* | 9/2011 | Goulding | G05D 1/0891 |
| | | | | 180/8.1 |
| 2012/0121161 | A1* | 5/2012 | Eade | G06F 16/444 |
| | | | | 901/1 |
| 2012/0298430 | A1* | 11/2012 | Schroll | B62D 55/075 |
| | | | | 180/9.1 |
| 2015/0190925 | A1* | 7/2015 | Hoffman | B25J 9/161 |
| | | | | 901/47 |
| 2017/0157777 | A1* | 6/2017 | Hopkins | B25J 13/08 |
| 2017/0269589 | A1* | 9/2017 | Clarke | A63H 29/22 |
| 2018/0036879 | A1* | 2/2018 | Buibas | B25J 19/023 |
| 2018/0086575 | A1* | 3/2018 | McCarthy | B65G 41/002 |
| 2019/0091858 | A1* | 3/2019 | Morin | B25J 9/142 |
| 2020/0172184 | A1* | 6/2020 | Abdellatif | B62D 9/002 |
| 2020/0183410 | A1* | 6/2020 | Kim | G05D 1/0246 |
| 2021/0229281 | A1* | 7/2021 | Natarajan | B25J 9/1669 |
| 2021/0316456 | A1* | 10/2021 | Zamora Esquivel | B25J 9/1666 |
| 2021/0319693 | A1* | 10/2021 | Chen | G01R 33/04 |
| 2022/0087106 | A1* | 3/2022 | Faulring | B25J 15/0616 |
| 2022/0105629 | A1* | 4/2022 | Natarajan | G05B 19/4189 |
| 2023/0146867 | A1* | 5/2023 | Traut | B62D 57/02 |
| | | | | 180/199 |

FOREIGN PATENT DOCUMENTS

| | | | | | |
|---|---|---|---|---|---|
| CN | 106570932 | A | * | 4/2017 | G06T 17/00 |
| CN | 107053215 | A | * | 8/2017 | B25J 13/08 |
| CN | 109419456 | A | * | 3/2019 | A47L 11/24 |
| CN | 115431252 | A | * | 12/2022 | B25J 18/00 |
| KR | 20110137204 | A | * | 12/2011 | |

OTHER PUBLICATIONS

FireAnt3D_a_3D_self-climbing_robot_towards_non-latticed_robotic_self-assembly (Year: 2020).*
Self_Organized_Coordinated_Motion_in_Gorups (Year: 2007).*
Self-replicating_hierarchical_modular_robotic_swarms (Year: 2022).*
A_General_Locomotion_Approach_for_a_Novel_Multi-legged_Spherical_Robot (Year: 2023).*
Bionic_sea_urchin_Robot (Year: 2020).*
KR-20110137204-A translation (Year: 2011).*
CN-106570932-A translation (Year: 2017).*
CN-105894573-A translation (Year: 2016).*
CN-115431252-A translation (Year: 2022).*
CN-107053215-A translation (Year: 2017).*
CN-109419456-A translation (Year: 2019).*

* cited by examiner

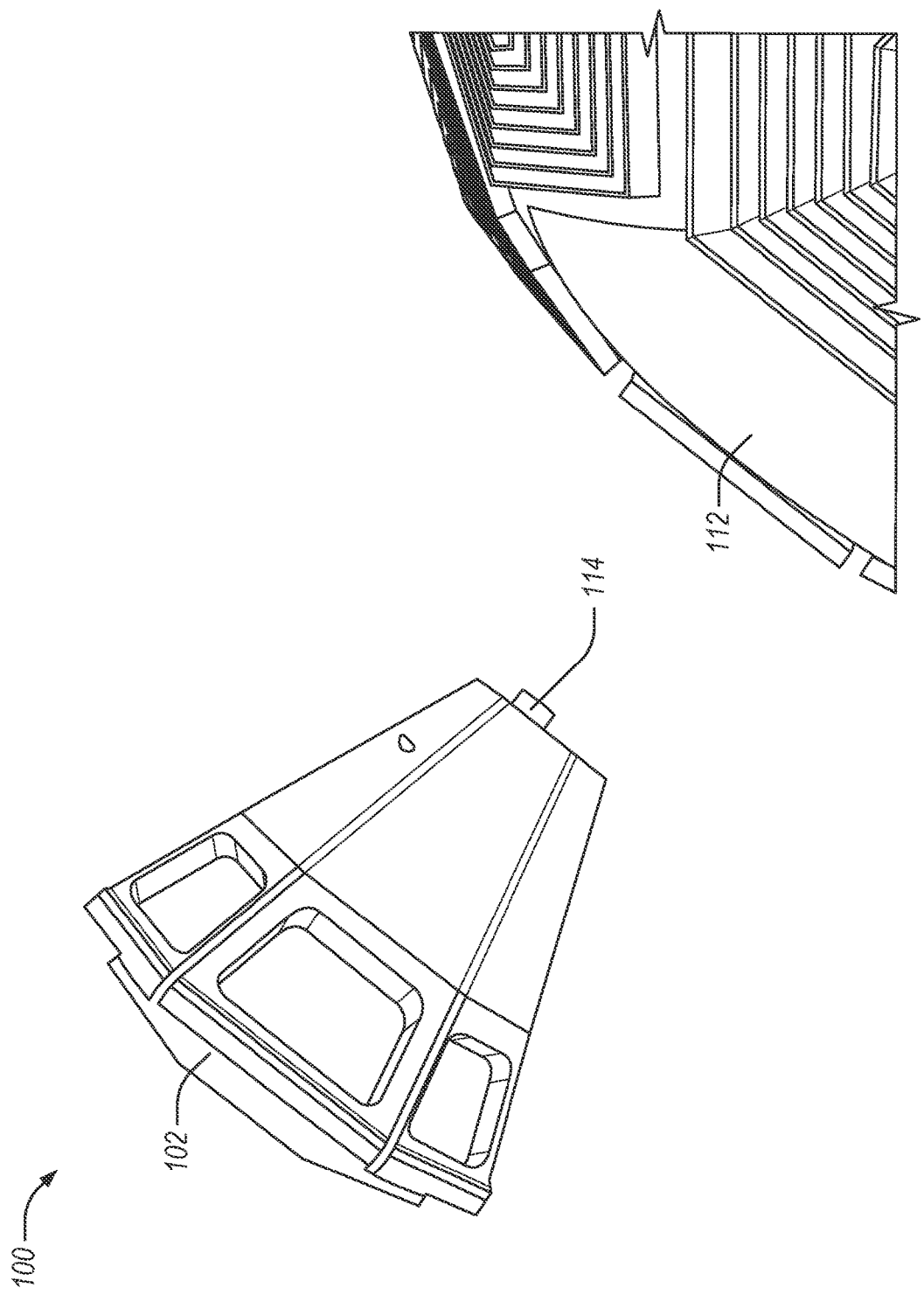

US 12,377,542 B2

GEOMETRIC ROBOTIC PLATFORM

BACKGROUND

Robots may be programmed to complete complex tasks. Typically, robots are programmed using software to control hardware, for example using a robotic control system. Many different types of robots exist to serve various uses, such as in space, under water, in manufacturing, as toys, for household chores, etc.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various examples discussed in the present document.

FIGS. 1A-1B illustrate views of two configurations of a robotic system, in accordance with some examples.

DETAILED DESCRIPTION

Figure 1A:
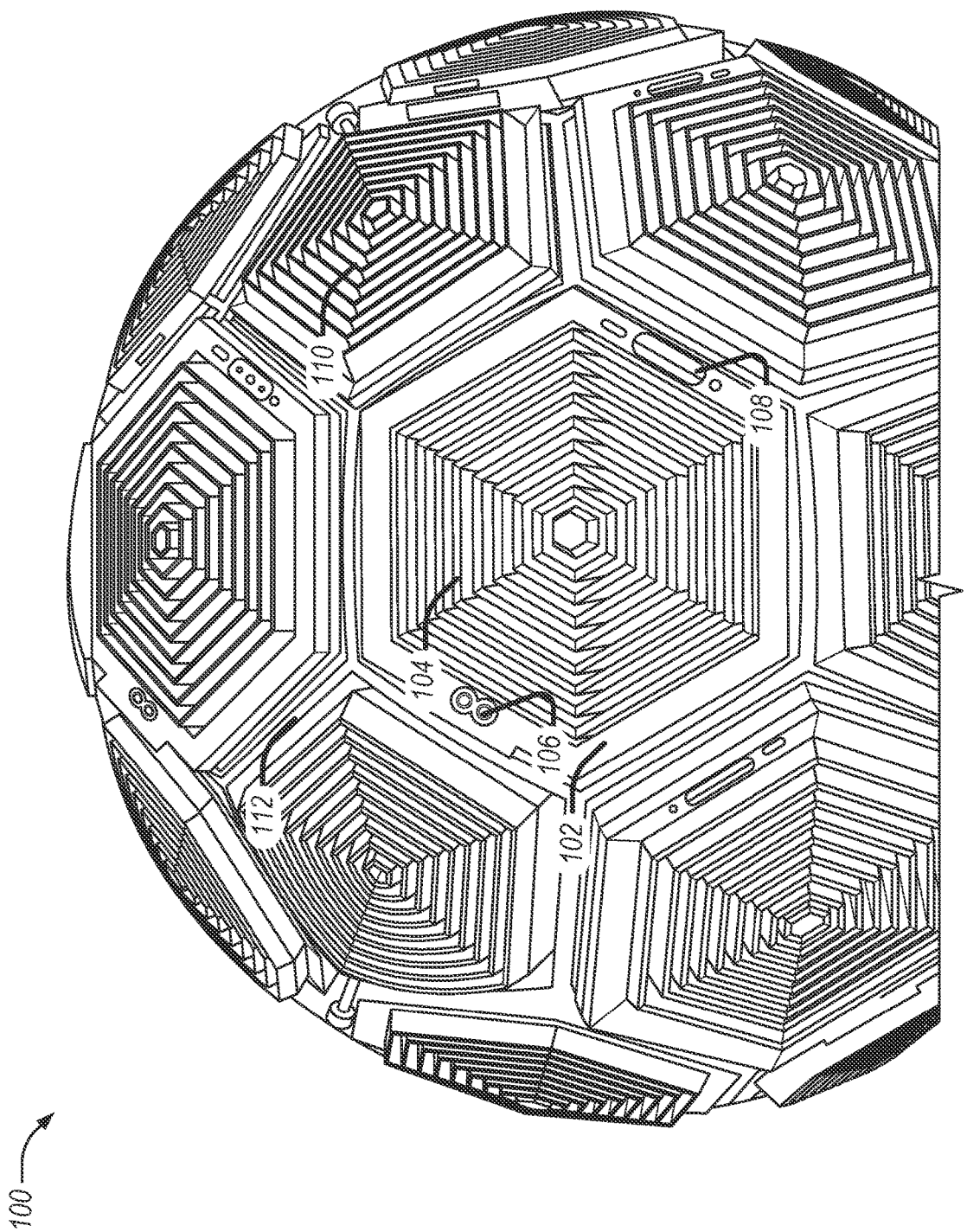

The systems and methods described herein may be used for autonomous movement of a robotic system. A robotic system may include a core device, a frame, and a plurality of independently moveable components. The components may be connected to the core device (e.g., physically or communicatively) to operate as the robotic system. The components may be removed from the robotic system.

A component may include a motor, operable to cause an outer surface of the component to move outward, away from the core. The outer surface may move by inflating, telescoping, pushing, etc. In an example, the motor rotates a screw, which pushes on an air bladder, which in turn pushes on the outer surface, causing the outer surface to telescope outward via a set of connected concentric shapes. The outer surface may have a shape, such as circular, hexagonal, pentagonal, square, triangular, etc. A component may be self-powered, for example including one or more batteries. A component may include a camera (e.g., a single lens camera, a depth camera, a plurality of cameras, etc.).

The core may operate as a control device for the robotic system. For example, the core may include processing circuitry, communications circuitry (e.g., for external communications or to communicate with the various components), a sensor (e.g., an inertial measurement unit (IMU), a global positioning system (GPS) sensor, or the like). The core may send control commands to a component, such as to activate a motor of the component. A component may be connected to the core via a port.

The robotic system may be moved using a component. When a particular component activates its motor and causes a surface of the component to extend, the surface may push on the ground or other surface. When the component extends, the robotic system moves in a direction opposite the axis of extension. The robotic system may be configured such that three or more components are touching a surface (e.g., the ground). These three components may be evaluated, such as with respect to a target location, to select one of the components to activate to move towards the target location.

The robotic system may be used to capture images, such as with a camera of a component. In some examples, each component of the robotic system has its own camera. The camera or cameras may be used to capture images of a surrounding environment (e.g., to generate a 360 view from the perspective of the robotic system), capture images of an object (e.g., which may include depth images, and a three-dimensional (3D) model of the object may be generated using the images), or the like.

In an example, the robotic system may be used for robust land exploration (e.g., in harsh or hostile terrain, on another planet, etc.). The robotic system includes a novel robot architecture, which may be in the shape of a polyhedral, such as an icosahedron. Exterior vertices of the icosahedron may include a linear motor and a camera in an interior vertex. The robotic system may use a locomotion mechanism to move over water, in an example. The unique locomotion may have a low energetic cost for operation of the robotic system. The robotic system is robust in that it may be used in different weather conditions. In an example, the robotic system may cause an object to move when the object has a mass of up to 600 kilograms.

In some examples, the robotic system may use cameras of the components and computer vision to follow a person, an object (e.g., a car), an animal, etc. Specific tasks may be implemented with the robotic system, such as moving objects around the house, conducting surveillance (e.g., around a path, taking pictures or video), taking a 360 image, generating images to create a 3D model of an object, or the like.

FIGS. 1A-1B illustrate views of two configurations of a robotic system 100, in accordance with some examples. The robotic system 100 includes a core (not visible), a frame 112, and a plurality of components (e.g., component 102 and 110). The component 102, for example, includes a camera 106, a hexagonal face, including an extendible surface 104, and a charging port 108. The component 110 includes a pentagonal face with an extendible surface. In some examples, each of the plurality of components may include a camera and a charging port. In other examples, only one, or only some of the plurality of components includes a camera or a charging port. In a particular example, one or more of the components includes a camera, but only one component includes the charging portion 108. In this particular example, the component with the charging port 108 (e.g., in the example shown, component 102) may receive power. Other components or the core may be charged using the component with the charging port 108. In some examples, wireless charging may be used to charge a component or the core.

The plurality of components may be removeable and interchangeable (for other slots in the frame 112 having a same geometric opening). In FIG. 1A, the plurality of components are shown fully inserted into the frame 112 and connected to the core. In FIG. 1B, the component 102 is shown removed from the frame. In this view, a connector 114 of the component 102 is visible. The connector 114 may be used to physically connect the component 102 to the core. The connector 114 may be used to communicatively couple the component 102 to the core. The connector 114 may be locked, such as using a locking mechanism controlled by an application run by processing circuitry of the core.

In geometry, a star polyhedron is a polyhedron which has some repetitive quality of nonconvexity giving it a star-like visual quality. In the example shown in FIG. 1A, the robotic system 100 includes an icosahedron shape where every external vertex has a truncated pyramid associated with it. The truncated pyramid shape is shown in FIG. 1B where component 102 extends from its face to the connector 114. In an example, the face of the component 102 is hexagonal or pentagonal, and in other examples, the face may be octagonal, triangular, square, circular, etc. The frame 112 may include a structural base to house the core and structural scaffolding to house the components. In an example, each component may operate autonomously or collaboratively, such as to move the robotic system 100 towards a goal (e.g., a target location).

In an example, the camera 106 may have a field of view based on arrangement of the component 102 in the robotic system 100. For example, the field of view may include sixty-degrees. When multiple components each have a camera, some fields of view of the cameras may overlap.

The component 102 may include processing circuitry. The processing circuitry may identify a location within the robotic system 100 of the component 102. In some examples, the core may identify positions of the various components and communicate those positions to the components themselves. In other examples, each component may identify its location and optionally share that information with the other components or the core.

When a component is inserted, an orientation of the component may be restricted, such as to align the connector 114 to a receiving port on the core, to ensure camera field of view coverage, etc. In other examples, orientation may be limited to a set of configurations (e.g., two orientations). In still other examples, orientation may not be limited. In an example, the connector 114 is a USB (e.g., USB 3.0, 2.0, 1.0, etc.) or HDMI connector.

Figure 2A:
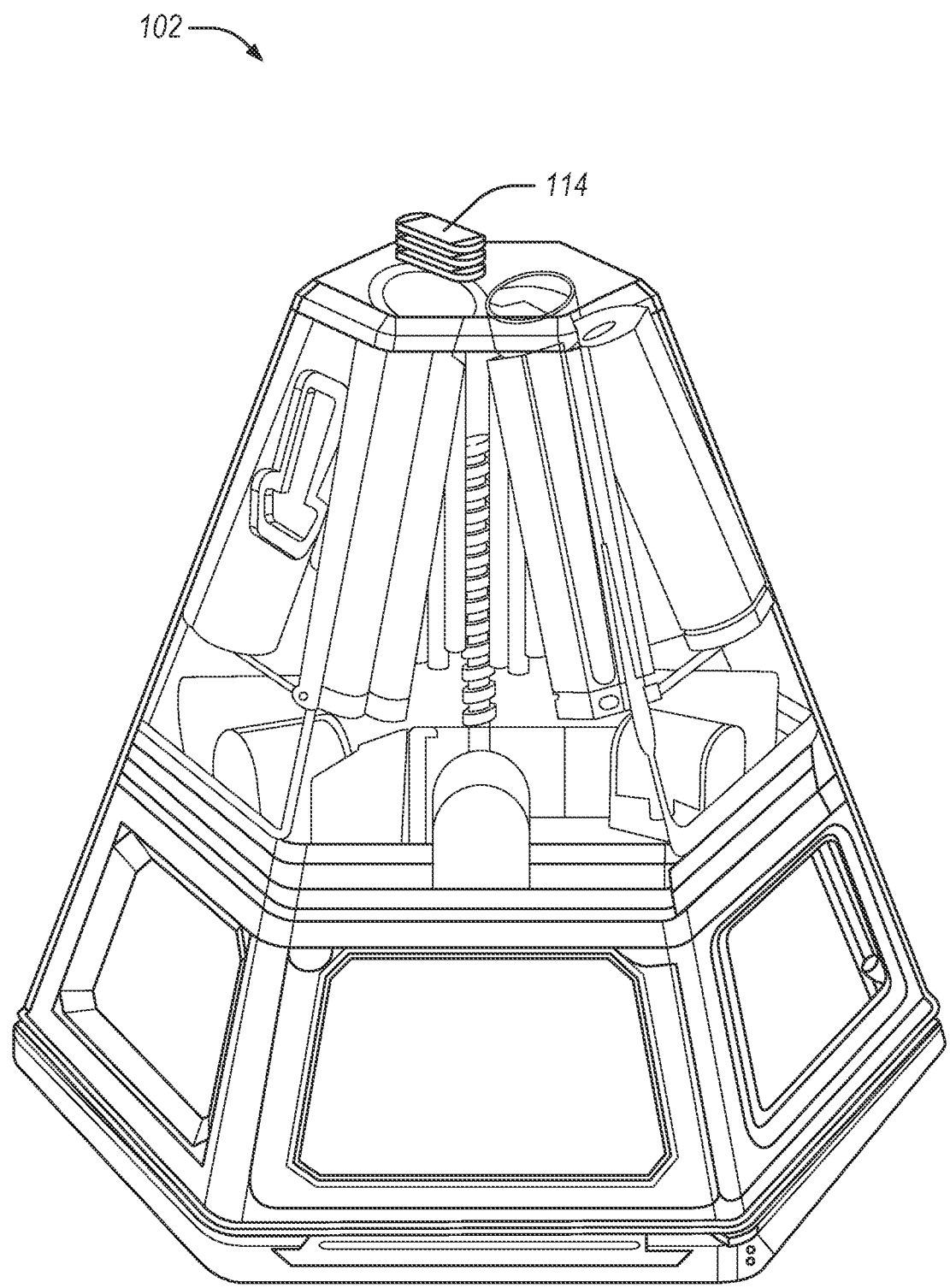
FIGS. 2A-2D illustrate various views and configurations of a robotic component of a robotic system, in accordance with some examples.
Figure 2B:
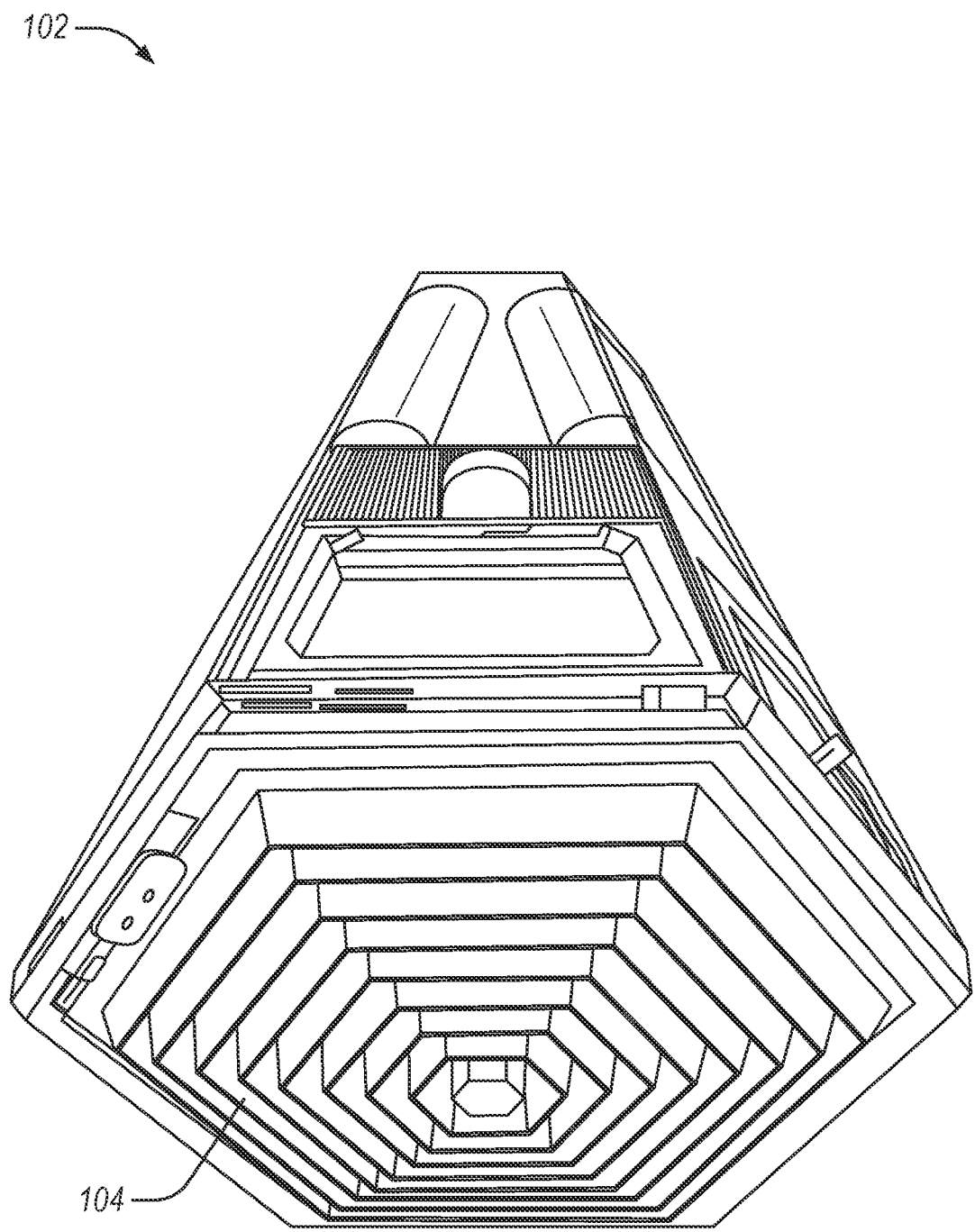
Figure 2C:
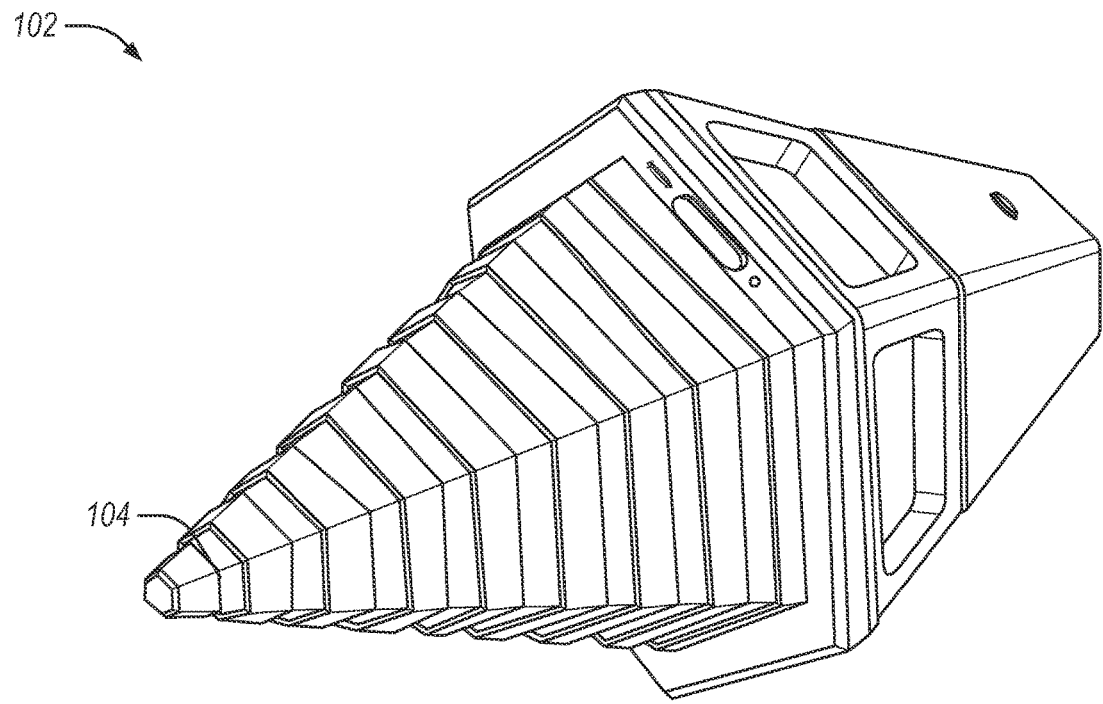
Figure 2D:
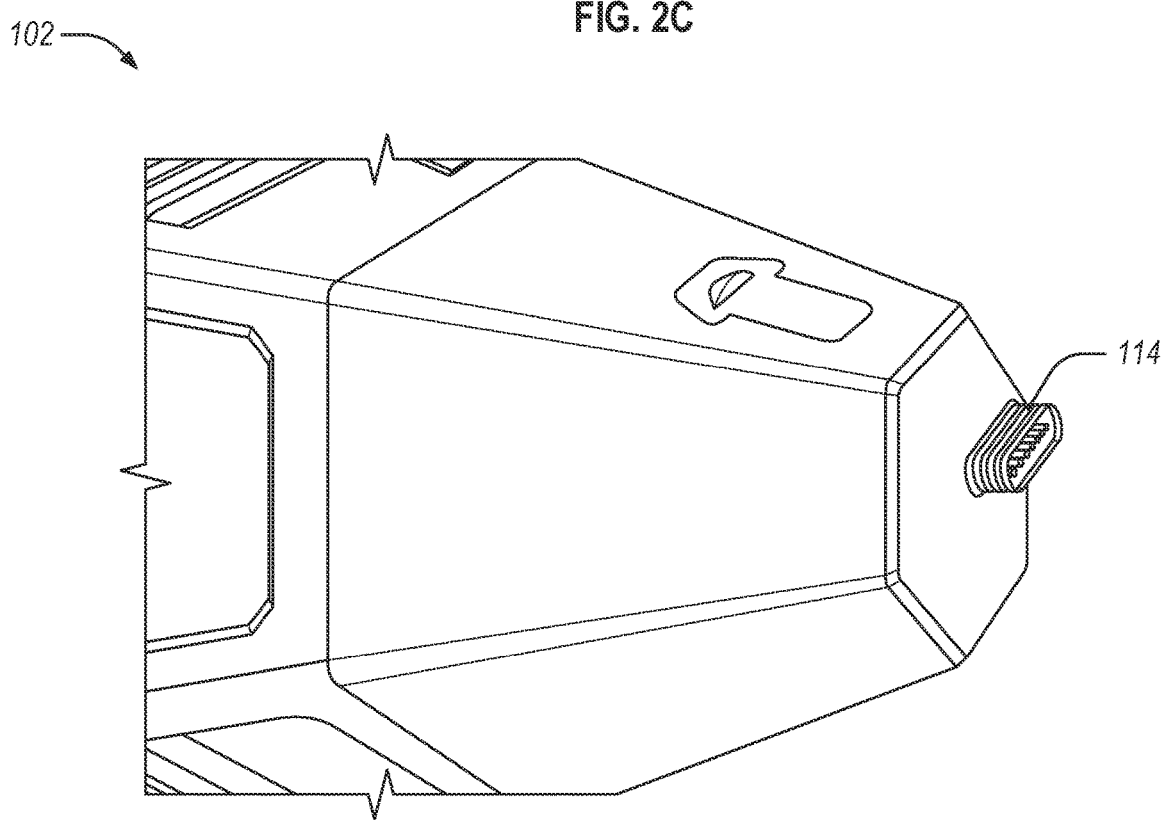

FIGS. 2A-2C illustrate various views and configurations of a robotic component of a robotic system, in accordance with some examples. FIGS. 2A-2B and FIG. 2D illustrate more detailed views of the component 102, including the connection 114 and the extendible surface 104.

In an example, a component, such as component 102 may operate in different modes. For example, the component 102 may operate in a controlled mode, an autonomous mode, an idle mode, or the like. In the controlled mode, coordination may occur by the core or one of the components of the robotic device. Coordination may include central planning, trajectory determination, activation sequence determination, etc., of all motors of the robotic system. In this mode, the component may share sensor data with the centralized controller, but otherwise not need to perform processing. In the autonomous mode, each component may operate separately, and communicate to coordinate to achieve a task. For example, each component may learn how to act to achieve a common goal, such as reaching a target location. In the idle mode, the component may operate at low power, not activate its motor, sleep, or otherwise limit actions.

FIG. 2C illustrates the extendible surface 104 in a fully extended position. The extendible surface 104 may telescope out using a layered set of connected concentric shapes. Each layer of the shapes may have a smaller diameter or perimeter, such that the shapes may fit back together to form a surface. Each smaller shape may extend further than its larger adjacent counterpart. A final smallest shape may have a solid face. The extendible surface 104 may be extended when an internal linear motor elongates or causes a screw to elongate. A prismatic diaphragm or air bladder may be inflated, pushing air out to the extendible surface 104, producing an elongation.

The component 102 may be locked in place in the frame or as connected to the core. The component 102 may be ejected via the core, such as after receiving an instruction from a user device (e.g., an application on a phone or computer), or via a button push (e.g., a button on the frame, on the component, etc.).

Each component may be recharged individually, such as via a charging port, wireless charging, or by removing the component and charging via the connector 114. In an example one component may be charged by another. In an example the core may be charged by a component. In other examples, the core may charge a component (e.g., when a component charges the core, the core may then in turn charge other components, such that only a single component may have a charging port).

Figure 3:
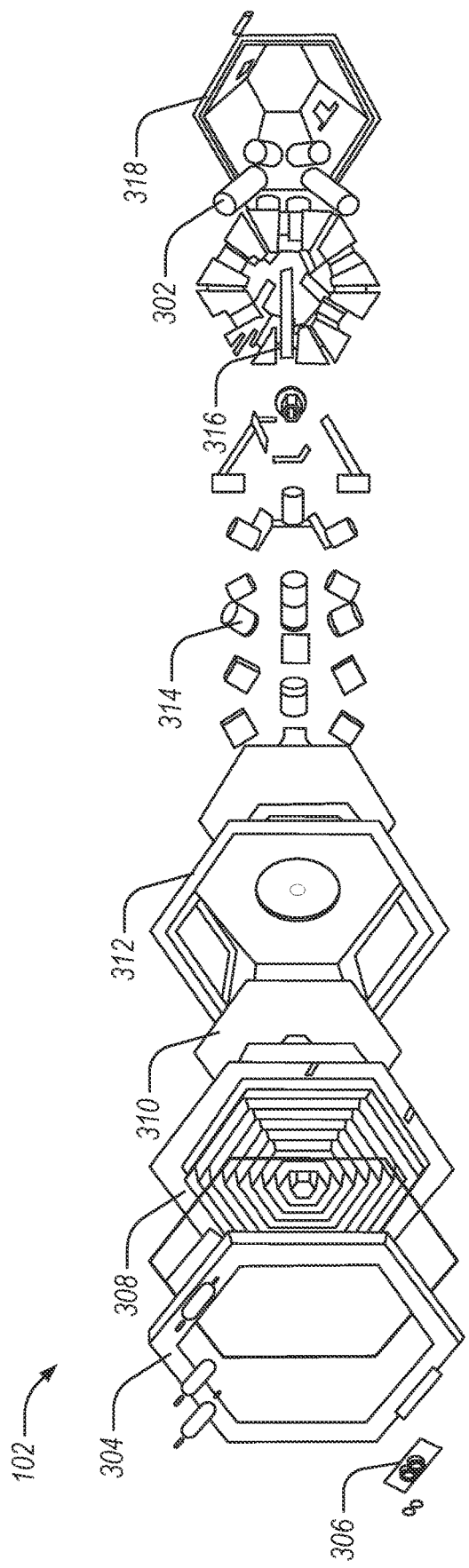
FIG. 3 illustrates an exploded view of an example robotic component, in accordance with some examples.

FIG. 3 illustrates an exploded view of an example robotic component 102, in accordance with some examples. The robotic component 102 is shown with a hexagonal face and extendible surface, but may be any shape described herein in other examples. The number of pieces shown may be changed based on the geometry of a robotic component. For example, six batteries (e.g., 302) are shown with the robotic component 102, but another number may be used with a different geometry (e.g., five with a pentagonal shape, three with a triangular shape, etc., although the number of batteries or other pieces does not need to match the dimension of the face). The robotic component 102 may include fewer pieces than depicted in FIG. 3, or additional pieces (e.g., a sensor, multiple versions of a piece, such as two cameras, an IMU, etc.).

The robotic component 102 is shown in FIG. 3 having example pieces including a frame 304 holding a camera 306 or an ultrasonic sensor or lidar, a membrane 308 that may be extended, and a metallic plaque 310 or diaphragm used to push the prismatic area of the membrane 308. The robotic component 102 includes a container frame 312, a set of motor windings (e.g., 314), a metallic screw 316, the battery 302, and an envelope frame 318.

Internal components of the robotic component 102 may include at least four batteries in an example, such that the robotic component 102 may be independently powered. Energy may be shared from one robotic component 102 to another or to the core in some examples (e.g., some components may have more or fewer batteries, where power is shared).

In an example, when a motor of the robotic component 102 becomes inoperable (e.g., breaks, stops working, batteries are dead, etc.), a robot system may continue working without any issues or changes, as long as that robotic component 102 is on top of the robot. An algorithm for movement may include avoiding use of the inoperable robotic component, such as by avoiding allowing that robotic component to be in contact with a ground surface. The resiliency of the robotic system may, in some examples extend to multiple components being inoperable.

The batteries (e.g., 302) may be used to power the motor (e.g., windings 314), to turn the screw 316 to push on the metallic plaque 310 or the diaphragm to cause the membrane 308 to expand. The robotic component 102 may include a connector, which is not shown in the example in FIG. 3. The connector may connect the robotic component 102 to a core of a robotic system. The connection may be physical, connective, or both.

Figure 4:
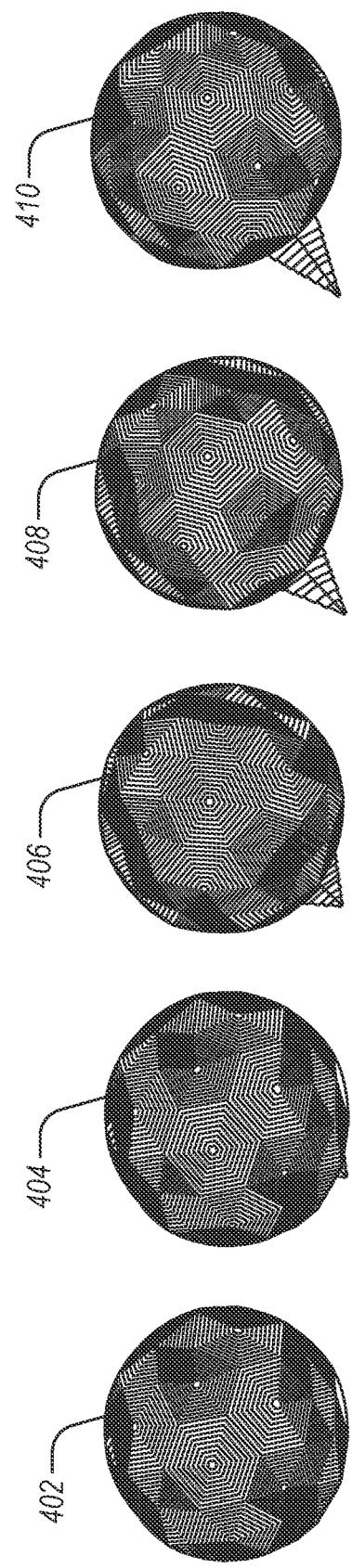
FIG. 4 illustrates a kinematic technique for robotic system movement, in accordance with some examples.

FIG. 4 illustrates a kinematic technique for robotic system movement, in accordance with some examples. The kinetic technique illustrated in FIG. 4 shows the robotic system moving via an extension of a robotic component of the robotic system. The robotic component initially is not extended in view 402, and progresses to extend further in each of vies 404, 406, and 408. In view 410, the robotic component has extended its extendible surface to a maximum or controlled amount (e.g., an amount determined to satisfy a movement criteria, such as to move the robotic system towards a target location).

In order to move the robot system, a linear motor of the robotic component may elongate, moving air in the robotic component to push a surface of the robotic component to elongate. Movement may be achieved by a single robotic component inflating, due to the circular shape of the robotic system. In some examples, other robotic components may inflate, such as to provide stability, to move more quickly, to stop the robotic system, or the like. For a soft surface (e.g., sand or dirt), all robotic components touching the soft surface may be extended, at least a portion (e.g., the axis legs) to create a stable position before pushing off or to provide support.

An elongation length of a robotic component may be controlled, for example by an amount the screw 316 of FIG. 3 is turned by the motor. The screw 316 may precisely control the elongation, with regard to speed of extension, length of extension, or both. Control of the speed or length of extension may control speed or distance traveled by the robotic system.

All three robotic components touching a surface or about to touch a surface may be extended to stop the robotic system. A movement technique may be inverted to stop the robotic system, for example by elongating a robotic component opposite of a current movement vector of the robotic system. Stopping may be controlled, such that the stopping is gradual.

Figure 5A:
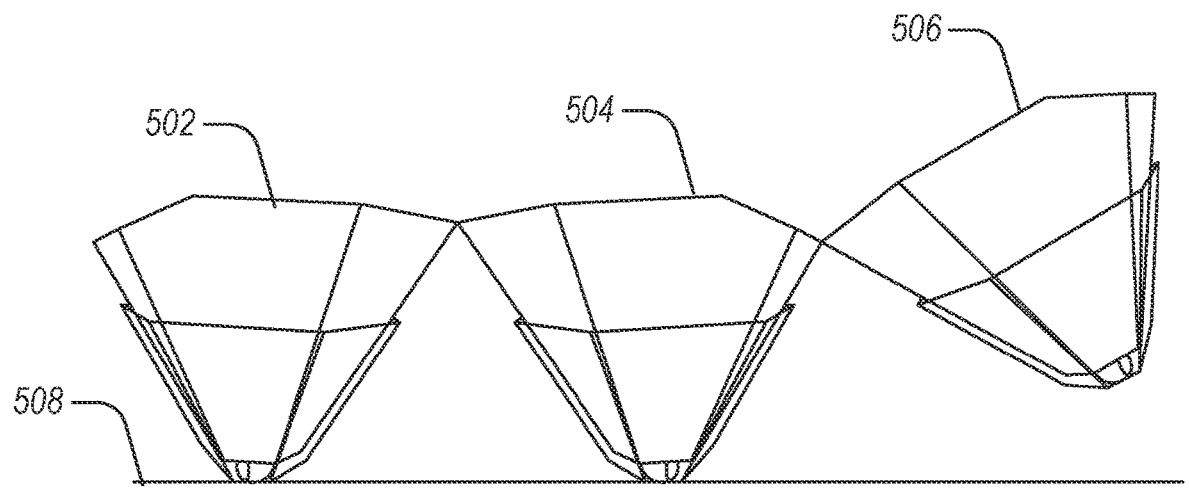
FIGS. 5A-5B illustrate a detailed view of activation of a robotic component to initiate movement of a robotic system, in accordance with some examples.
Figure 5B:
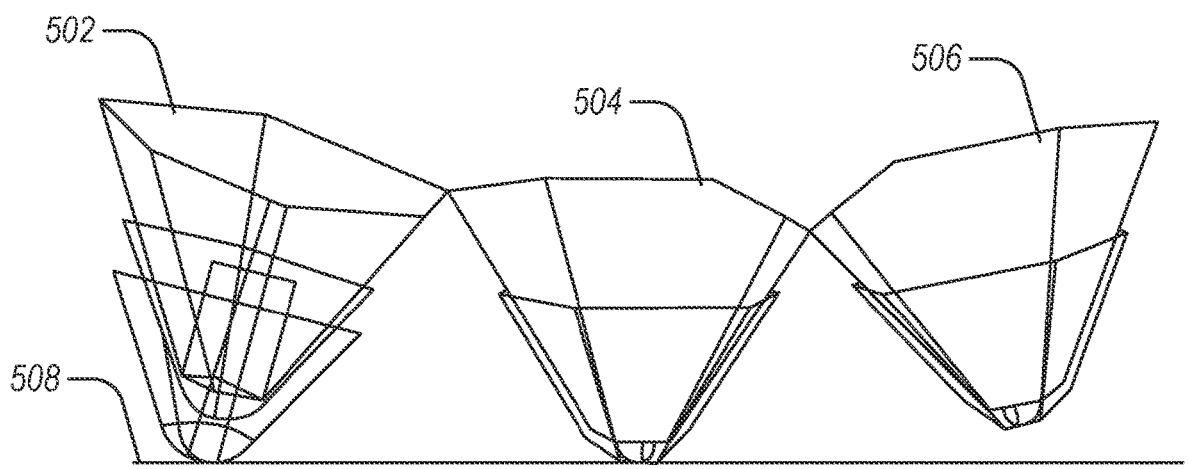

FIGS. 5A-5B illustrate a detailed view of activation of a robotic component to initiate movement of a robotic system, in accordance with some examples. FIG. 5A shows three example components 502, 504, and 506 at a first view while the robotic system is in motion. FIG. 5B shows the example components at a second view while the robotic system is in motion, the second view after the first view. Component 502 in FIG. 5A is in contact with a surface 508, and then in FIG. 5B, has been activated and, after pushing against the surface 508, is no longer in contact with the surface 508. Component 504 is in contact with the surface 508 in both FIGS. 5A and 5B, and may act as an axis of rotation, a stable point for the robotic system, a future movement component, or the like.

The component 506 may be a future component in contact with the surface 508, for example after movement initiated by the component 502 is completed or has started. In FIG. 5B, component 506 is closer to the surface 508 than in FIG. 5A. After a portion of the movement initiated by component 502 is completed, component 506 may be in contact with surface 508. In this example, the components 504 and 506 may be used to initiate a next movement operation.

Figure 6:
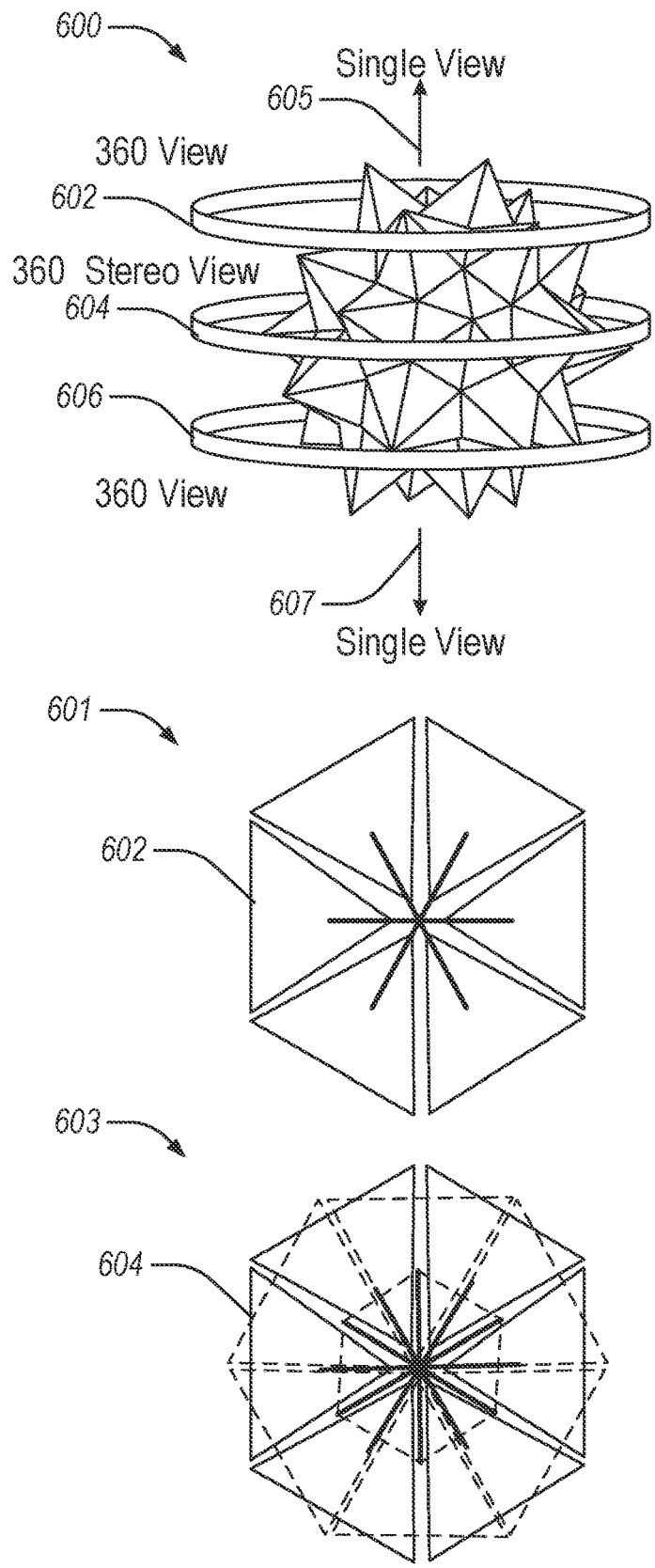
FIG. 6 illustrates camera coverage of various areas with respect to a robotic system, in accordance with some examples.

FIG. 6 illustrates camera coverage of various areas with respect to a robotic system, in accordance with some examples. A first view 600 illustrates different camera effects on various planes or axes, such as planes 602 and 606, on which the robotic system may capture 360-degree views. For plane 604, the robotic system may capture 460 stereo views of its surroundings. For axes 605 and 607, the robotic system may capture single images or videos.

The different view types may be generated based on overlap of field of view of cameras of the robotic system. For example, in the central plane 604, omnidirectional stereo views may be captured using the cameras, which may completely overlap with at least two views. In planes 602 and 606, the cameras may be used to capture an omnidirectional view (e.g., because the cameras have complete coverage of a 360 field of view of surroundings, but not necessarily 360 overlapping views).

In view 601, the robotic system is illustrated with has six cameras, which may be used to generate the omnidirectional view of plane 602. In view 603, the robotic system is illustrated with multiple cameras of overlapping views, where an omnidirectional stereo image may be generated for plane 604. Planes 602, 604, and 606 may move along a certain range according to the size and camera capabilities of the robotic system. For example, plane 602 may extend from a few centimeters above a surface to within a few centimeters of the plane 604. In some examples, plane 604 maybe located along a middle band of a few centimeters or more.

Figure 7:
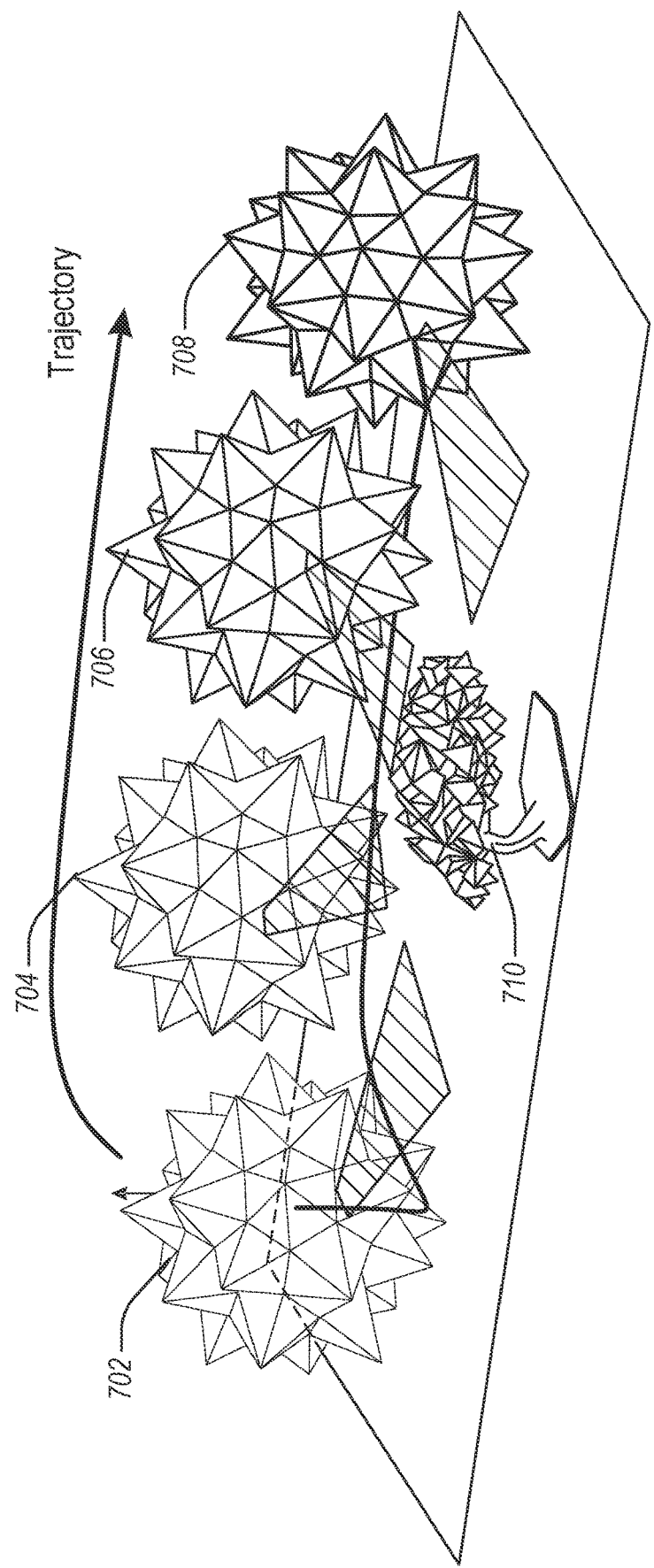
FIG. 7 illustrates a camera technique for 3D modeling with a robotic system, in accordance with some examples.

FIG. 7 illustrates a camera technique for 3D modeling with a robotic system, in accordance with some examples. The robotic system may be used to capture images of an object 710. The captured images may be used to construct a 3D model of the object 710. The captured images may be regular images or stereoscopic images in some examples.

In FIG. 7, a robotic device is shown in various positions over time, starting with position 702 and moving through positions 704, 706, and 708. Position 708 may be a current position, but not necessarily a last position. Position 702 may be an initial position or may be an initial position for image capture, but not an initial position of the robotic system.

The robotic system may operate as a tripod with a camera. The components of the robotic system that are acting as a tripod or operating the camera may change as the positions change. For example, the robotic system may continuously move about the object 710, capturing images as it moves. In another example, the robotic system may pause at each position to capture an image or images of the object 710. The positions 702-708 may be determined such that images captured at these positions are sufficient to generate a 3D model of the object 710 (e.g., include sufficient overlap or stereoscopic imaging).

Figure 8:
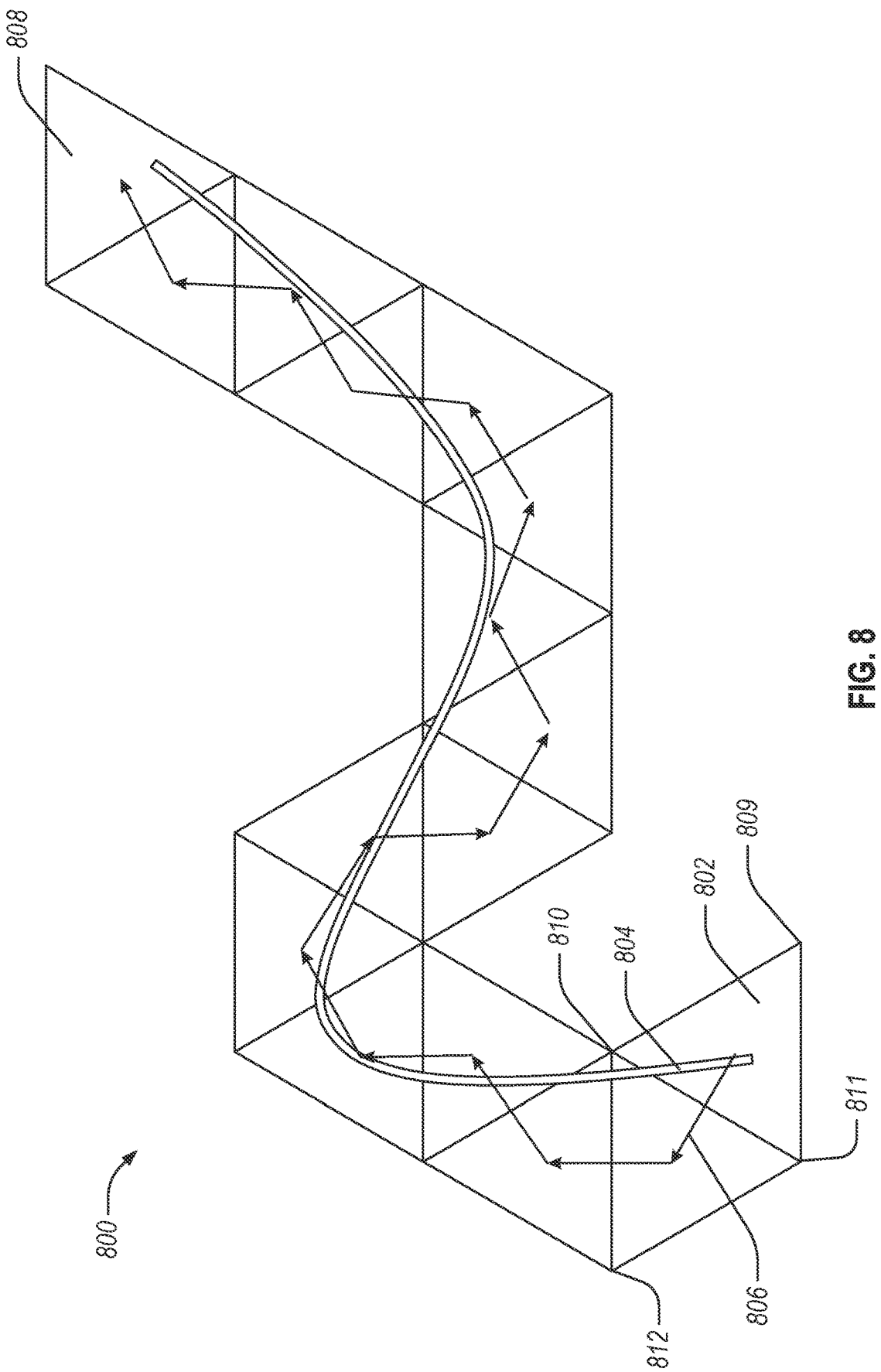
FIG. 8 illustrates a discrete path for autonomous movement of a robotic system, in accordance with some examples.

FIG. 8 illustrates a discrete path 800 for autonomous movement of a robotic system, in accordance with some examples. The discrete path 800 starts at an initial position 802, and tracks a curved path 804, to reach a target position 808. The discrete path 800 is made up of a plurality of movement segments, such as an initial movement segment 806. Each point of the initial position 802 may represent a robotic component of the robotic system (e.g., a central point of each of three robotic components make up the points of the triangle of initial position 802). A central point of the robotic system may move according to the discrete path 800, along each segment (e.g., segment 806). The robotic system may move along the initial movement segment 806 based on a robotic component extending a surface along an axis of the segment 806, but in an opposite direction (e.g., from point 809).

The robotic system may navigate along the discrete path 800, which may be towards a target location, along a curved path 804, or may be towards are target location but with obstacle avoidance along the path. In an example, only one motor (of a robotic component) need to be activated at the time. In another example, multiple motors may be activated to stop the robotic system, to assist with difficult terrain (e.g., sand or dirt), to aid in speeding up the robotic system, or the like.

A kinematics technique for the robotic system may be used. The kinematics technique includes first determining whether a target location is within its current position (e.g., the initial position 802). When the target location is within the current position, then the robotic system may stop. The target location may be a point, an object (e.g., in object follow objectives), an area, or the like. In the example of FIG. 8, the target location may be within or coincident with the target position 808.

In an example, x1 (at point 809), x2 (at point 810), and x3 (at point 811) are the points of the initial position 802, which represent robotic components in contact with a surface. A set of neighbor points to x1, x2, and x3, are points p1, p2, p3 (not shown). These points (p1, p2, and p3) represent the three next points (robotic components) that touch the floor depending on which robotic component's motor is activated (of the x1, x2, and x3 robotic components). Stated another way, the points p1, p2, p3 are points opposite each of x1, x2, and x3 when the robotic system rotates about one of the axes x1-x2, x2-x3, or x3-x1. In this example, p1 may be represented at point 812, where the robotic system ends up after the movement along the initial movement segment 806 based on activation of the motor of the robotic component at point 809. After the initial movement segment 806, the robotic system has a new set of three robotic components touching a surface, namely x2, x3, p1 (at points 810, 811, and 812, respectively). The kinematics technique may be iterated using the new set to move along a next movement segment, in consideration of obstacle avoidance and the target location (and optionally in consideration of any robotic components that are missing motors that are non-functional, or other issues).

In an example, the kinematics technique may include determining which of p1, p2, and p3 are closest to a target (optionally subject to obstacle avoidance, discussed further below). The closest of p1, p2, and p3 may be used to determine which motor (of x1, x2, or x3) to activate. The motor activated may include the robotic component corresponding to the point opposite the closest of p1, p2, and p3 across an axis of two of x1, x2, or x3. For example, in FIG. 8, p1 at point 812 may be determined to be the closest to a target location (the target location may move in some examples, or p1 may be the only viable or best option based on obstacle avoidance). Because x1 at point 809 is across an axis of x2-x3 from p1, the motor of the robotic component at x1 at point 809 may be selected to activate. In this example, x1-x2 may be selected as an axis of rotation, and the robotic component at x3 may be activated to move along the initial movement segment 806 to put p1 in contact with a surface. Note that in this example, p1 replaces x1 in a new set of components in contact with a surface, while an entirely new set of neighbor points are used (e.g., p4 adjacent p1 and x2, p5 adjacent p1 and x3, and now using x1 as a neighbor point, since it remains adjacent x2 and x3).

Determining which of p1, p2, p3 are closest to the target location may include using a distance formula (e.g., a dot product based on coordinates of p1, p2, p3, and the target location or a central portion of the target location). In an example, camera triangulation to the target location may be used. For example, a target point is identified using cameras of the robotic system, while location of the points on the robot may be known based on an IMU of the robotic system (e.g., an average IMU among robotic components, an IMU of the core, etc.), or other sensor information.

The distance formula may use a center of the initial position 802 (e.g., a centroid of the triangle), projections of p1, p2, p3 on the surface, and a projection of the target location (or a center or perimeter point of the target location). The distance to the target location is determined for each of the projected points p1, p2, p3, and the shortest distance may be chosen.

In an example, an internal coordinate system to the robotic system may be used to identify the target location. For example, a target coordinate may be entered (e.g., by a user on a map, via coordinates, based on selection of a target object to reach or track etc.). A camera identified position of the target location may be translated into the internal coordinate system for determining the distances. In another example, the cameras of the robotic system may produce a stereoscopic 360 view, which may capture or include identified depth or distance information for navigation to the target location.

In the kinematics technique, a redetection of the next closest point to the target location may be determined for each new set of robotic components touching the surface (e.g., after each movement segment). This may help with error correction (e.g., an entirely preplanned path may have issues if something interrupts, bumps, or moves the robot, or if obstacle avoidance occurs).

In an example, an artificial intelligence (AI) model may be used that allows each of the robotic components to behave independently. Each of these independent robotic components may determine its own motion, such as based on information received from other robotic components, camera images, or the like. In another example, an AI model running on the core of the robotic system may be used that controls activation of motors of the robotic components, and may learn movement concepts over time to improve movement. A core AI model may avoid use of a robotic component that is non-functional or limited in functionality (e.g., does not extend fully or as swiftly as other components). The core AI model may learn better techniques to avoid particular obstacles or to traverse difficult surfaces over time. In an example, such AI models may be implemented through use of software based models (e.g., neural networks, machine learning algorithms), or acceleration circuitry (e.g., neural processing circuits, neuromorphic hardware, etc.) In some examples, the robotic system may operate without human intervention, such as after initial input on a target location (e.g., when operating on another planet).

In further examples, any of the compute nodes or devices discussed with reference to the present robotic computing systems and environment may be fulfilled based on the components depicted in FIGS. 9A and 9B. Respective robotic components may be embodied as a type of device capable of communicating with a core or an edge, networking, or endpoint component.

Figure 9A:
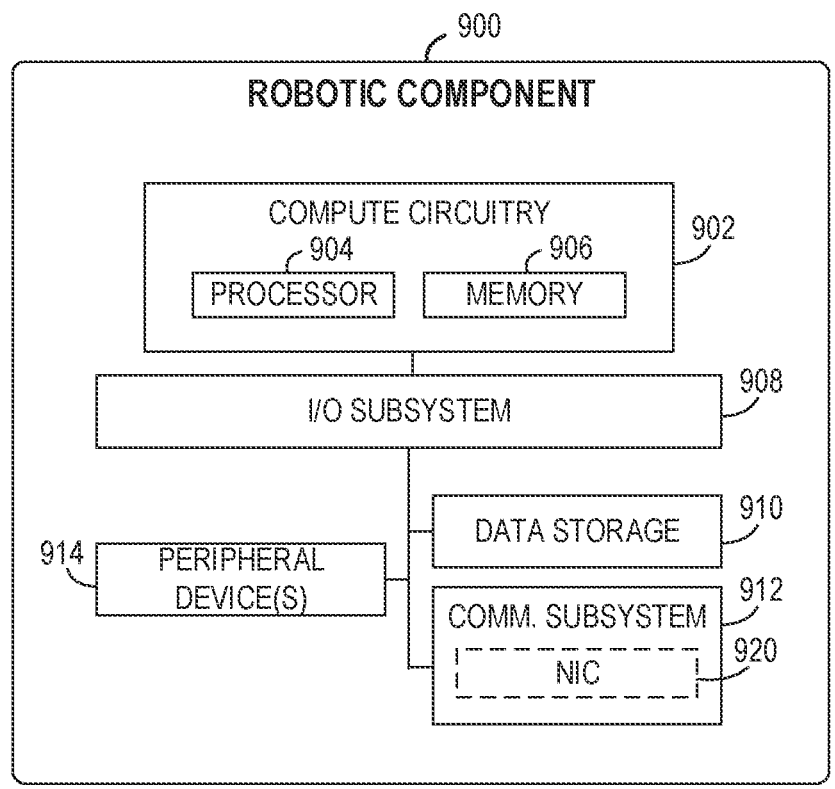
FIG. 9A provides an overview of example components for compute deployed at a compute node.

In the simplified example depicted in FIG. 9A, a robotic component 900 (e.g., the core device or the connected robotic components described herein throughout) includes a compute engine (also referred to herein as "compute circuitry") 902, an input/output (I/O) subsystem 908, data storage 910, a communication circuitry subsystem 912, and, optionally, one or more peripheral devices 914 (e.g., a camera, a sensor, etc.). In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The robotic component 900 may be embodied as any type of engine, device, or collection of devices capable of performing various compute functions. In some examples, the robotic component 900 may include a single device such as an integrated circuit, an embedded system, a field-programmable gate array (FPGA), a system-on-a-chip (SOC), or other integrated system or device. In the illustrative example, the robotic component 900 includes or is embodied as a processor 904 and a memory 906. The processor 904 may be embodied as any type of processor capable of performing the functions described herein (e.g., executing an application). For example, the processor 904 may be embodied as a multi-core processor(s), a microcontroller, a processing unit, a specialized or special purpose processing unit, or other processor or processing/controlling circuit.

In some examples, the processor 904 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 904 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 904 may work in coordination with each other to execute many types of operations and instructions within and on behalf of the robotic component 900.

The memory 906 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three-dimensional crosspoint memory device (e.g., Intel® 3D XPoint™ memory), or other byte addressable write-in-place nonvolatile memory devices. The memory device may refer to the die itself or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 906 may be integrated into the processor 904. The memory 906 may store various software and data used during operation such as one or more applications, data operated on by the application, library, and driver.

The compute circuitry 902 is communicatively coupled to other components of the robotic component 900 via the I/O subsystem 908, which may be embodied as circuitry or components to facilitate input/output operations with the compute circuitry 902 (e.g., with the processor 904 or the main memory 906) and other components of the compute circuitry 902. For example, the I/O subsystem 908 may be embodied as, or otherwise include, memory controller hubs, input/output control hubs, integrated sensor hubs, firmware devices, communication links (e.g., point-to-point links, bus links, wires, cables, light guides, printed circuit board traces, etc.), or other components and subsystems to facilitate the input/output operations. In some examples, the I/O subsystem 908 may form a portion of a system-on-a-chip (SoC) and be incorporated, along with one or more of the processor 904, the memory 906, and other components of the compute circuitry 902, into the compute circuitry 902.

The one or more illustrative data storage devices 910 may be embodied as any type of devices configured for short-term or long-term storage of data such as, for example, memory devices and circuits, memory cards, hard disk drives, solid-state drives, or other data storage devices. Individual data storage devices 910 may include a system partition that stores data and firmware code for the data storage device 910. Individual data storage devices 910 may also include one or more operating system partitions that store data files and executables for operating systems depending on, for example, the type of robotic component 900.

The communication circuitry 912 may be embodied as any communication circuit, device, or collection thereof, capable of enabling communications between the compute circuitry 902 and another compute device (e.g., from a connected robotic component to a core device in a robotic system or from the core device or the connected robotic component to a network, such as over wireless communications to the internet.). The communication circuitry 912 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN), low-power wide-area (LPWA) protocols, etc.), or near filed communication (NFC), to effect such communication.

The illustrative communication circuitry 912 includes a network interface controller (NIC) 920, which may also be referred to as a host fabric interface (HFI), and is optional. The NIC 920 may be embodied as one or more add-in-boards, daughter cards, network interface cards, controller chips, chipsets, or other devices that may be used by the robotic component 900 to connect with another compute device (e.g., an edge gateway node). In some examples, the NIC 920 may be embodied as part of a system-on-a-chip (SoC) that includes one or more processors, or included on a multichip package that also contains one or more processors. In some examples, the NIC 920 may include a local processor (not shown) or a local memory (not shown) that are both local to the MC 920. In such examples, the local processor of the NIC 920 may be capable of performing one or more of the functions of the compute circuitry 902 described herein. Additionally, or alternatively, in such examples, the local memory of the NIC 920 may be integrated into one or more components of the client compute node at the board level, socket level, chip level, or other levels.

Additionally, in some examples, a respective robotic component 900 may include one or more peripheral devices 914. Such peripheral devices 914 may include any type of peripheral device that may found in a compute device or server such as audio input devices, a display, other input/output devices, interface devices, camera, sensor, IMU, light, or other peripheral devices, depending on the particular type of the robotic component 900.

Figure 9B:
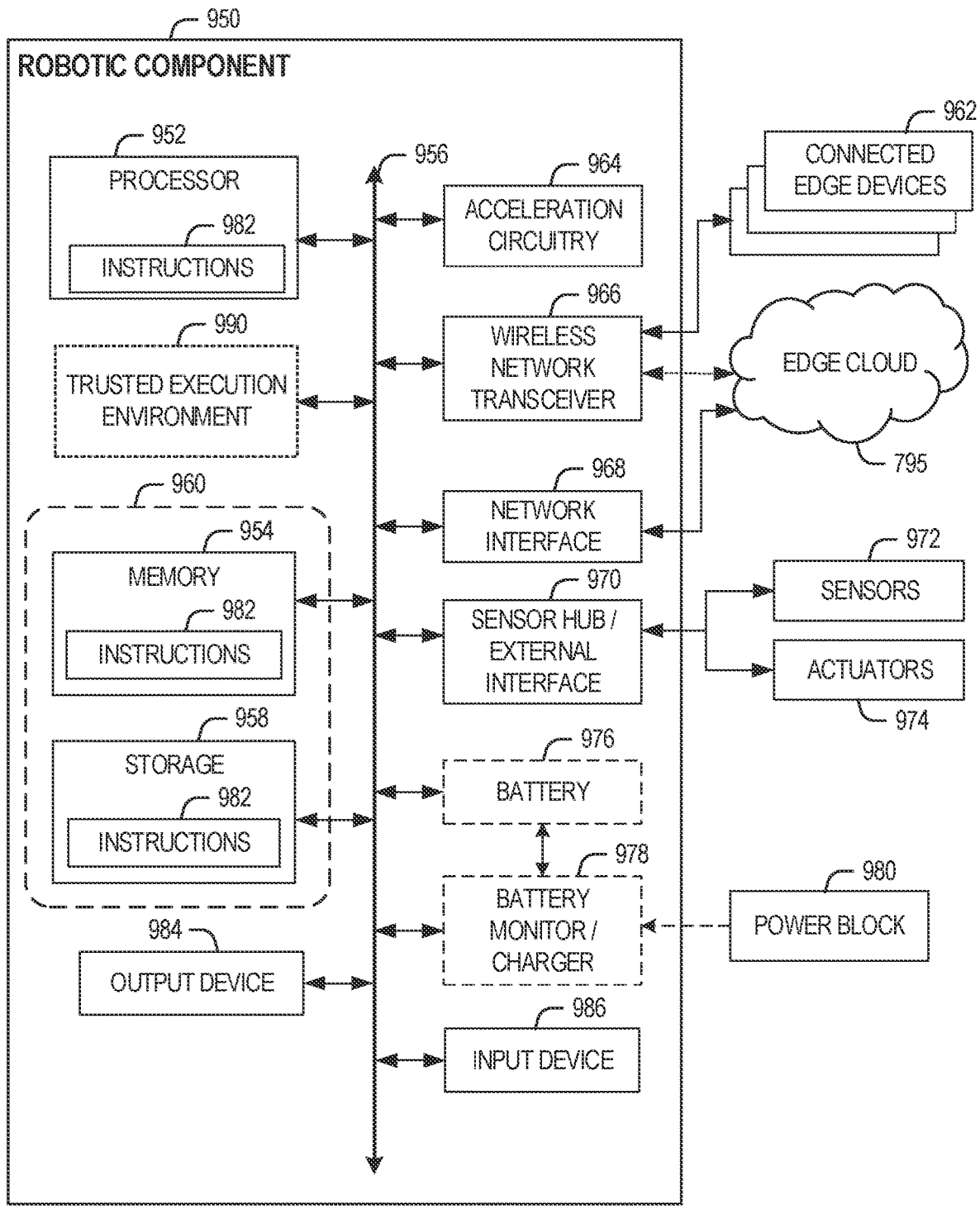
FIG. 9B provides a further overview of example components within a computing device.

In a more detailed example, FIG. 9B illustrates a block diagram of an example of components that may be present in a robotic component 950 for implementing the techniques (e.g., operations, processes, methods, and methodologies) described herein. This robotic component 950 provides a closer view of the respective components of robotic component 900 when implemented as or as part of a computing device (e.g., as a core device, a connected robotic component, etc.). The robotic component 950 may include any combinations of the hardware or logical components referenced herein, and it may include or couple with any device usable with a robotic system. The components may be implemented as integrated circuits (ICs), portions thereof, discrete electronic devices, or other modules, instruction sets, programmable logic or algorithms, hardware, hardware accelerators, software, firmware, or a combination thereof adapted in the robotic component 950, or as components otherwise incorporated within a chassis of a larger system.

The robotic component 950 may include processing circuitry in the form of a processor 952, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 952 may be a part of a system on a chip (SoC) in which the processor 952 and other components are formed into a single integrated circuit, or a single package, such as the Edison™ or Galileo™ SoC boards from Intel Corporation, Santa Clara, Calif. As an example, the processor 952 may include an Intel® Architecture Core™ based CPU processor, such as a Quark™, an Atom™, an i3, an i5, an i7, an i9, or an MCU-class processor, or another such processor available from Intel®. However, any number of other processors may be used, such as available from Advanced Micro Devices, Inc. (AMD®) of Sunnyvale, Calif., a MIPS®-based design from MIPS Technologies, Inc. of Sunnyvale, Calif., an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 952 and accompanying circuitry may be provided in a single socket form factor, multiple socket form factor, or a variety of other formats, including in limited hardware configurations or configurations that include fewer than all elements shown in FIG. 9B.

The processor 952 may communicate with a system memory 954 over an interconnect 956 (e.g., a bus). Any number of memory devices may be used to provide for a given amount of system memory. As examples, the memory 954 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 958 may also couple to the processor 952 via the interconnect 956. In an example, the storage 958 may be implemented via a solid-state disk drive (SSDD). Other devices that may be used for the storage 958 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 958 may be on-die memory or registers associated with the processor 952. However, in some examples, the storage 958 may be implemented using a micro hard disk drive (HDD). Further, any number of new technologies may be used for the storage 958 in addition to, or instead of, the technologies described, such resistance change memories, phase change memories, holographic memories, or chemical memories, among others.

The components may communicate over the interconnect 956. The interconnect 956 may include any number of technologies, including industry standard architecture (ISA), extended ISA (EISA), peripheral component interconnect (PCI), peripheral component interconnect extended (PCIx), PCI express (PCIe), or any number of other technologies. The interconnect 956 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 956 may couple the processor 952 to a transceiver 966, for communications with the connected edge devices 962. The transceiver 966 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 962. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 966 (or multiple transceivers) may communicate using multiple standards or radios for communications at a different range. For example, the robotic component 950 may communicate with close devices, e.g., within about 10 meters, using a local transceiver based on Bluetooth Low Energy (BLE), NFC, or another low power radio, to save power. More distant connected edge devices 962, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 966 (e.g., a radio transceiver) may be included to communicate with devices or services in the edge cloud 995 via local or wide area network protocols. The wireless network transceiver 966 may be a low-power wide-area (LPWA) transceiver that follows the IEEE 802.15.4, or IEEE 802.15.4g standards, among others. The robotic component 950 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 966, as described herein. For example, the transceiver 966 may include a cellular transceiver that uses spread spectrum (SPA/SAS) communications for implementing high-speed communications. Further, any number of other protocols may be used, such as Wi-Fi® networks for medium speed communications and provision of network communications. The transceiver 966 may include radios that are compatible with any number of 3GPP (Third Generation Partnership Project) specifications, such as Long Term Evolution (LTE) and 5th Generation (5G) communication systems. A network interface controller (NIC) 968 may be included to provide a wired communication to nodes of the edge cloud 995 or to other devices, such as the connected edge devices 962 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 968 may be included to enable connecting to a second network, for example, a first NIC 968 providing communications to the cloud over Ethernet, and a second NIC 968 providing communications to other devices over another type of network.

Given the variety of types of applicable communications from the device to another component or network, applicable communications circuitry used by the device may include or be embodied by any one or more of components 964, 966, 968, or 970. Accordingly, in various examples, applicable means for communicating (e.g., receiving, transmitting, etc.) may be embodied by such communications circuitry.

The robotic component 950 may include or be coupled to acceleration circuitry Error! Reference source not found.64, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 956 may couple the processor 952 to a sensor hub or external interface 970 that is used to connect additional devices or subsystems. The devices may include sensors 972, such as accelerometers, IMUs, level sensors, flow sensors, optical light sensors, camera sensors, temperature sensors, global navigation system (e.g., GPS) sensors, pressure sensors, barometric pressure sensors, and the like. The hub or interface 970 further may be used to connect the robotic component 950 to actuators 974, such as power switches, valve actuators, an audible sound generator, a visual warning device, and the like.

In some optional examples, various input/output (I/O) devices may be present within or connected to, the robotic component 950. For example, a display or other output device 984 may be included to show information, such as sensor readings or actuator position. An input device 986, such as a touch screen or keypad may be included to accept input. An output device 984 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the robotic component 950. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 976 may power the robotic component 950. In an example, the battery 976 may include a plurality of batteries. The battery 976 may be rechargeable from a power source, such as an electrical grid or another robotic component 950 (e.g., a battery of the core may be charged from a battery of a connected robotic component). The battery 976 may be a lithium ion battery, a metal-air battery, such as a zinc-air battery, an aluminum-air battery, a lithium-air battery, or the like.

A battery monitor/charger 978 may be included in the robotic component 950 to track the state of charge (SoCh) of the battery 976, if included. The battery monitor/charger 978 may be used to monitor other parameters of the battery 976 to provide failure predictions, such as the state of health (SoH) and the state of function (SoF) of the battery 976. The battery monitor/charger 978 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 978 may communicate the information on the battery 976 to the processor 952 over the interconnect 956. The battery monitor/charger 978 may also include an analog-to-digital (ADC) converter that enables the processor 952 to directly monitor the voltage of the battery 976 or the current flow from the battery 976. The battery parameters may be used to determine actions that the robotic component 950 may perform, such as transmission frequency, mesh network operation, sensing frequency, and the like.

A power block 980, or other power supply coupled to a grid, may be coupled with the battery monitor/charger 978 to charge the battery 976. In some examples, the power block 980 may be replaced with a wireless power receiver to obtain the power wirelessly, for example, through a loop antenna in the robotic component 950. A wireless battery charging circuit, such as an LTC4020 chip from Linear Technologies of Milpitas, Calif., among others, may be included in the battery monitor/charger 978. The specific charging circuits may be selected based on the size of the battery 976, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 958 may include instructions 982 in the form of software, firmware, or hardware commands to implement the techniques described herein. Although such instructions 982 are shown as code blocks included in the memory 954 and the storage 958, it may be understood that any of the code blocks may be replaced with hardwired circuits, for example, built into an application specific integrated circuit (ASIC).

In an example, the instructions 982 provided via the memory 954, the storage 958, or the processor 952 may be embodied as a non-transitory, machine-readable medium 960 including code to direct the processor 952 to perform electronic operations in the robotic component 950. The processor 952 may access the non-transitory, machine-readable medium 960 over the interconnect 956. For example, the non-transitory, machine-readable medium 960 may be embodied by devices described for the storage 958 or may include specific storage units such as optical disks, flash drives, or any number of other hardware devices. The non-transitory, machine-readable medium 960 may include instructions to direct the processor 952 to perform a specific sequence or flow of actions, for example, as described with respect to the flowchart(s) and block diagram(s) of operations and functionality depicted above. As used herein, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 10:
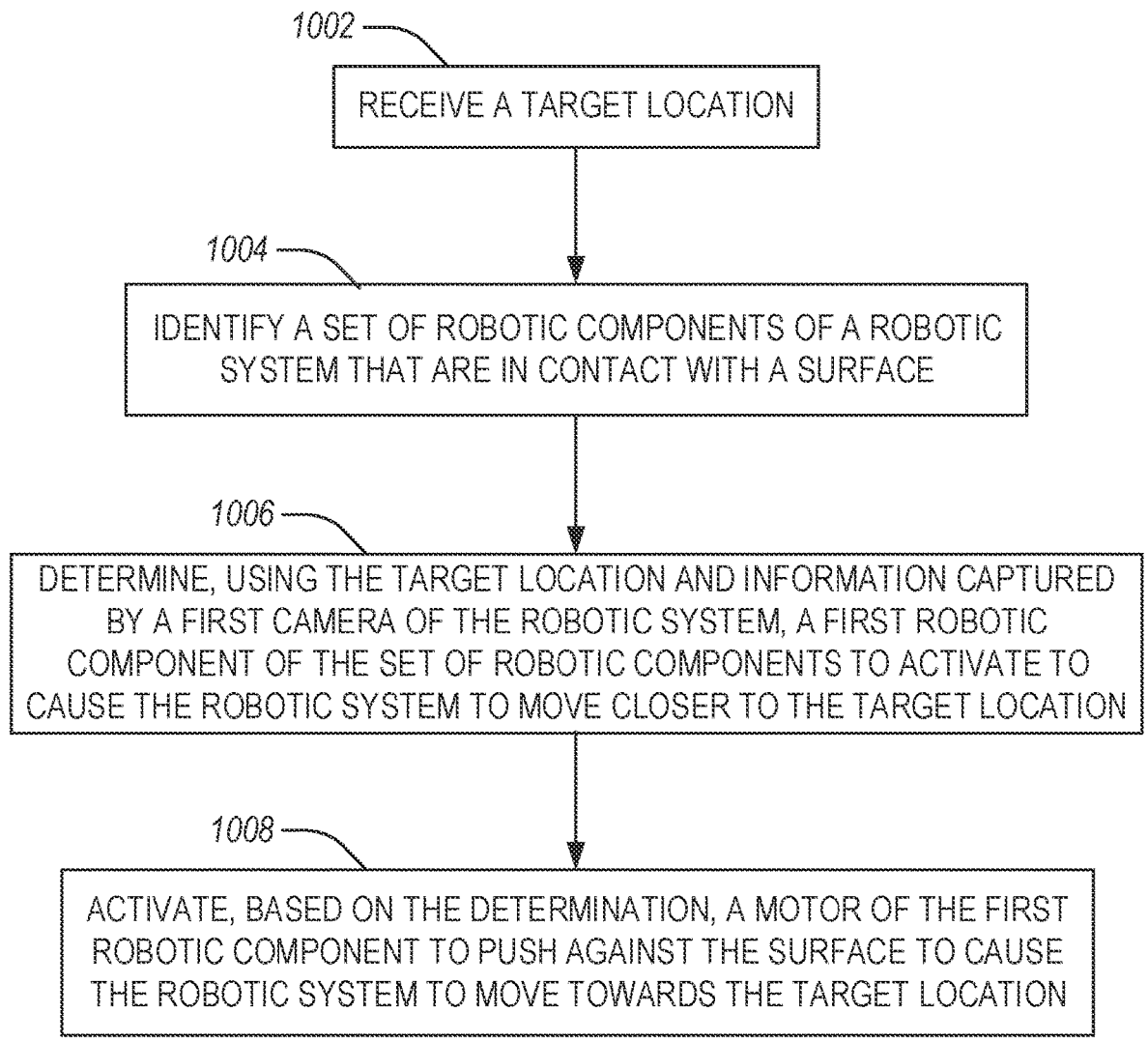
FIG. 10 illustrates a flowchart showing a technique for autonomous movement of a robotic system having a plurality of independently moveable components, in accordance with some examples.

FIG. 10 illustrates a flowchart showing a technique 1000 for autonomous movement of a robotic system having a plurality of independently moveable components, accordance with some examples. The technique 1000 may be performed by a device including processing circuitry and memory. In an example, the processing circuitry and memory are part of a core device of the robotic system in communication with each of the plurality of components. In other examples, aspects of the technique 1000 may be performed by processing circuitry of one or more of the components, or a combination of one or more components and the core device. The memory may include instructions, to be executed by the processing circuitry. The instructions may include operations to control actions of one or more of the plurality of components, such as to achieve a task (e.g., autonomous movement).

The technique 1000 includes an operation 1002 to receive a target location. Operation 1002 may include receiving location instructions via communication circuitry of the robotic system, such as from a user device (e.g., a mobile device, a computer, etc.). An internal coordinate system of the robotic system may be used to identify the target location. In another example, the target location may be identified by the robotic system, for example as part of a given task. In some examples, operation 1002 includes using a camera of the robotic system to capture an image (e.g., a depth image) of the target location. From the image, the target location may be expressed in terms of an internal coordinate system of the robotic system. From the internal coordinate system target location, a path to the target location may be determined. In an example, the target location may be on a moving object. In this example, the robotic system may be configured to follow the moving object.

The technique 1000 includes an operation 1004 to identify a set of robotic components of a robotic system that are in contact with a surface.

The technique 1000 includes an operation 1006 to determine, using the target location and information captured by a first camera of the robotic system, a first robotic component of the set of robotic components to activate to cause the robotic system to move closer to the target location. In an example, the robotic components may include a hexagonal or pentagonal surface. Operation 1006 may include using a distance from a point on each of the first robotic component and the two other robotic components to the target location, and selecting the first robotic component based on the first robotic component corresponding to a shortest distance to the target location.

In an example, operation 1006 may include identifying a second set of robotic components of the plurality of independently moveable components, each of the second set of robotic components being adjacent to two components of the first set of robotic components. In this example, the technique 1000 may include determining a reference component from the second set of three components that is closest to the target location using the information captured by the first camera, the reference component being adjacent to a second and a third components of the first set of robotic components. The second and third components in this example may form the axis. In this example, the reference component may include the first camera. In this example, after movement of the robotic system from the activating the motor of the first robotic component, the reference component is in contact with the surface. The technique 1000 may be iterated with the two other robotic components and the reference component replacing the first set of robotic components after the movement.

The technique 1000 includes an operation 1008 to activate, based on the determination, a motor of the first robotic component to push against the surface to cause the robotic system to move towards the target location. Operation 1008 may include sending a control signal (e.g., from a core of the robotic device or from processing circuitry of the first robotic component) to cause the motor to turn a screw of the first robotic component, the screw turning causing an air bladder to inflate, the air bladder inflation causing a membrane to extend to push on the surface. Before operation 1008, the technique 1000 may include determining whether a collision would be caused by activating the motor. In this example, if a collision would be caused, operation 1008 may be canceled, and a motor of a different robotic component may be selected for activating, for example to avoid or move around the object. In some examples, an imminent collision may be detected while the robotic device is in motion, such as after activating the motor in operation 1008. In these examples, evasive steps may be taken, for example activating a motor of one or more robotic components, such as to slow down, speed up, or change direction of the robotic system. These movements may not necessarily move the robotic system towards the target location, and after avoiding the object, the technique 1000 may resume with determining a motor to activate to advance towards the target location.

The technique 1000 may include capturing images using cameras of the plurality of independently moveable components of an object while the robotic system traverses a loop around the object to reach the target location. In this example, a three-dimensional model of the object may be generated using the captured images. The technique 1000 may include capturing images of surroundings of the robotic system using cameras of the plurality of independently moveable components while the robotic system moves to the target location. In this example, a depth image of a portion of the surroundings may be generated.

Figure 11:
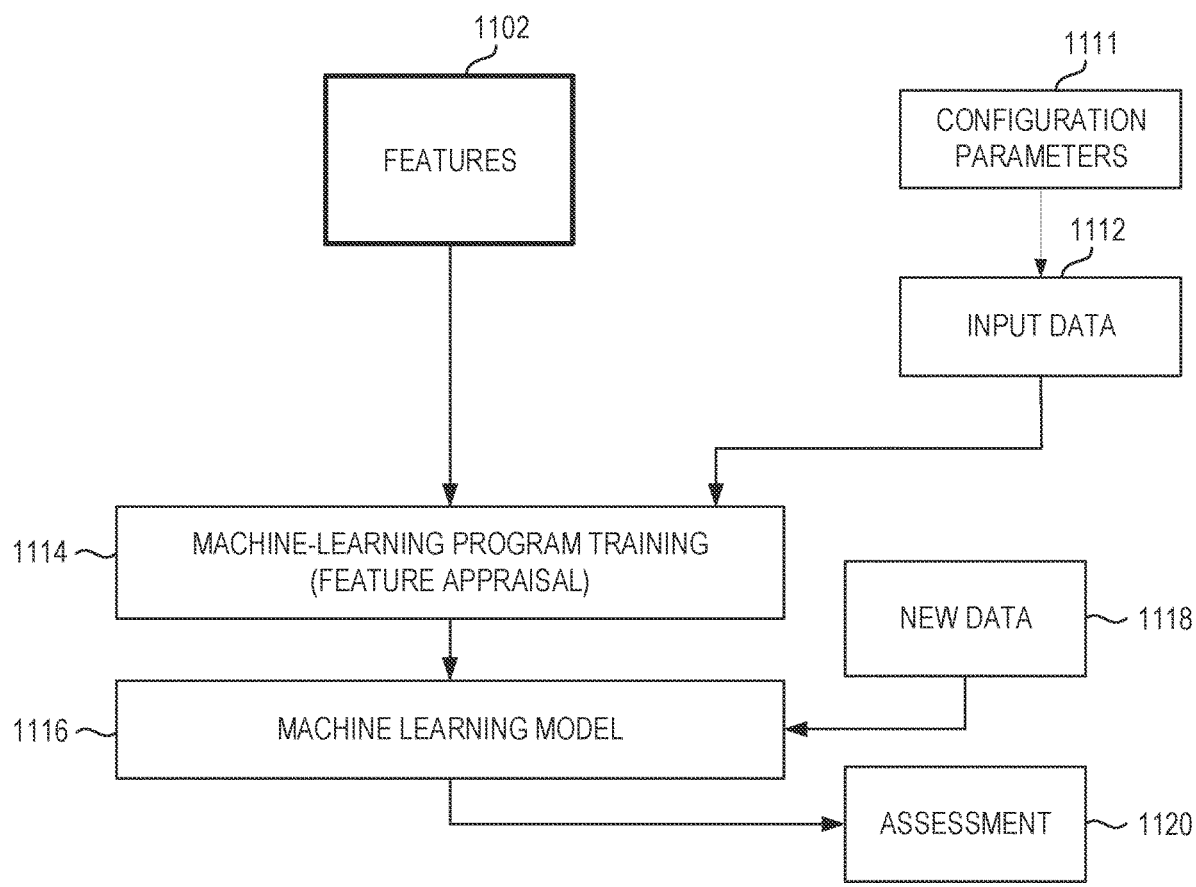
FIG. 11 illustrates training and use of a machine-learning program in accordance with some examples.

FIG. 11 illustrates the training and use of a machine-learning program, according to some example embodiments. In some example embodiments, machine-learning programs (MLPs), also referred to as machine-learning algorithms or tools, are utilized to coordinate robots to perform a complex task.

Machine Learning (ML) is an application that provides computer systems the ability to perform tasks, without explicitly being programmed, by making inferences based on patterns found in the analysis of data. Machine learning explores the study and construction of algorithms, also referred to herein as tools, that may learn from existing data and make predictions about new data. Although example embodiments are presented with respect to a few machine-learning tools, the principles presented herein may be applied to other machine-learning tools.

There are two common modes for ML: supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm using information that is neither classified nor labeled, and allowing the algorithm to act on that information without guidance. Unsupervised ML is useful in exploratory analysis because it can automatically identify structure in data.

Common tasks for supervised ML are classification problems and regression problems. Classification problems, also referred to as categorization problems, aim at classifying items into one of several category values (for example, is this object an apple or an orange?). Regression algorithms aim at quantifying some items (for example, by providing a score to the value of some input). Some examples of commonly used supervised-ML algorithms are Logistic Regression (LR), Naive-Bayes, Random Forest (RF), neural networks (NN), deep neural networks (DNN), matrix factorization, and Support Vector Machines (SVM).

Some common tasks for unsupervised ML include clustering, representation learning, and density estimation. Some examples of commonly used unsupervised-ML algorithms are K-means clustering, principal component analysis, and autoencoders. In some embodiments, example ML model 1116 outputs actions for one or more robots to achieve a complex task.

The machine-learning algorithms use labeled or unlabeled data 1112 (e.g., a target location, obstacles, movement history, movement capabilities, etc.) to find correlations among identified features 1102 that affect the outcome. A feature 1102 is an individual measurable property of a phenomenon being observed. The concept of a feature is related to that of an explanatory variable used in statistical techniques such as linear regression. Choosing informative, discriminating, and independent features is important for effective operation of ML in pattern recognition, classification, and regression. Features may be of different types, such as numeric features, strings, and graphs.

During training 1114, the ML algorithm analyzes the input data 1112 based on identified features 1102 and configuration parameters 1111 defined for the training (e.g., environmental data, state data, etc.). The result of the training 1114 is an ML model 1116 that is capable of taking inputs to produce a complex task.

Training an ML algorithm involves analyzing data to find correlations. The ML algorithms utilize the input data 1112 to find correlations among the identified features 1102 that affect the outcome or assessment 1120.

The ML algorithms usually explore many possible functions and parameters before finding what the ML algorithms identify to be the best correlations within the data; therefore, training may make use of large amounts of computing resources and time, such as many iterations for a Reinforcement Learning technique.

Many ML algorithms include configuration parameters 1111, and the more complex the ML algorithm, the more parameters there are that are available to the user. The configuration parameters 1111 define variables for an ML algorithm in the search for the best ML model.

When the ML model 1116 is used to perform an assessment, new data 1118 is provided as an input to the ML model 1116, and the ML model 1116 generates the assessment 1120 as output.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together (e.g., including over a wire, over a network, using one or more platforms, wirelessly, via a software component, or the like), comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Additional examples of the presently described method, system, and device examples include the following, non-limiting implementations. Each of the following non-limiting examples may stand on its own or may be combined in any permutation or combination with any one or more of the other examples provided below or throughout the present disclosure.

Example 1 is a method for autonomous movement of a robotic system having a plurality of independently moveable components, the method comprising: receiving, at processing circuitry of the robotic system, a target location; identifying a first set of robotic components of the plurality of independently moveable components in contact with a surface; determining, using the target location and information captured by a first camera of the robotic system, a first robotic component of the first set of robotic components to activate to cause the robotic system to move closer to the target location; and activating, based on the determination, a motor of the first robotic component to push against the surface to cause the robotic system to pivot about an axis formed by two other robotic components of the first set of robotic components towards the target location.

In Example 2, the subject matter of Example 1 includes, wherein activating the motor includes sending a control signal to cause the motor to turn a screw of the first robotic component, the screw turning causing an air bladder to inflate, the air bladder inflation causing a membrane to extend to push on the surface.

In Example 3, the subject matter of Examples 1-2 includes, before activating the motor, determining whether a collision would be caused by activating the motor of the first robotic component.

In Example 4, the subject matter of Examples 1-3 includes, wherein receiving the target location includes receiving location instructions via communications circuitry of the robotic system and using an internal coordinate system to identify the target location.

In Example 5, the subject matter of Examples 1-4 includes, capturing images using cameras of the plurality of independently moveable components of an object while the robotic system traverses a loop around the object to reach the target location; and generating a three-dimensional model of the object using the captured images.

In Example 6, the subject matter of Examples 1-5 includes, capturing images of surroundings of the robotic system using cameras of the plurality of independently moveable components while the robotic system moves to the target location; and generating a depth image of a portion of the surroundings.

In Example 7, the subject matter of Examples 1-6 includes, wherein the target location is located on a moving object, and further comprising iterating the method to follow the moving object.

In Example 8, the subject matter of Examples 1-7 includes, wherein the first component includes a hexagonal surface initially in contact with the surface, wherein the one of the two other robotic components includes a pentagonal surface initially in contact with the surface, wherein the processing circuitry is located in a core of the robotic system, and wherein the first component is configured to plug into the core.

In Example 9, the subject matter of Examples 1-8 includes, wherein determining the first robotic component to activate includes: identifying a second set of robotic components of the plurality of independently moveable components, each of the second set of robotic components being adjacent to two components of the first set of robotic components; determining a reference component from the second set of three components that is closest to the target location using the information captured by the first camera, the reference component being adjacent to a second and a third components of the first set of robotic components; and wherein the second and the third components form the axis.

In Example 10, the subject matter of Example 9 includes, wherein the reference component includes the first camera.

In Example 11, the subject matter of Examples 9-10 includes, wherein after the robotic system moves, the reference component is in contact with the surface; and further comprising iterating the method with the two other robotic components and the reference component replacing the first set of robotic components.

In Example 12, the subject matter of Examples 1-11 includes, wherein determining the first robotic component to activate includes using a distance from a point on each of the first robotic component and the two other robotic components to the target location, and selecting the first robotic component based on the first robotic component corresponding to a shortest distance to the target location.

Example 13 is a machine-readable medium including instructions for autonomous movement of a robotic system having a plurality of independently moveable components, which when executed by processing circuitry of the robotic system, cause the processing circuitry to perform operations to: receive a target location; identify a first set of robotic components of the plurality of independently moveable components in contact with a surface; determine, using the target location and information captured by a first camera of the robotic system, a first robotic component of the first set of robotic components to activate to cause the robotic system to move closer to the target location; and activate, based on the determination, a motor of the first robotic component to push against the surface to cause the robotic system to pivot about an axis formed by two other robotic components of the first set of robotic components towards the target location.

In Example 14, the subject matter of Example 13 includes, wherein operations to activate the motor include operations to send a control signal to cause the motor to turn a screw of the first robotic component, the screw turning causing an air bladder to inflate, the air bladder inflation causing a membrane to extend to push on the surface.

In Example 15, the subject matter of Examples 13-14 includes, wherein before activating the motor, the instructions, when executed, cause the processor to determine whether a collision would be caused by activating the motor of the first robotic component.

In Example 16, the subject matter of Examples 13-15 includes, wherein operations to receive the target location include operations to receive location instructions via communications circuitry of the robotic system and use an internal coordinate system to identify the target location.

In Example 17, the subject matter of Examples 13-16 includes, wherein the instructions, when executed, cause the processor to: capture images using cameras of the plurality of independently moveable components of an object while the robotic system traverses a loop around the object to reach the target location; and generate a three-dimensional model of the object using the captured images.

In Example 18, the subject matter of Examples 13-17 includes, wherein the instructions, when executed, cause the processor to: capture images of surroundings of the robotic system using cameras of the plurality of independently moveable components while the robotic system moves to the target location; and generate a depth image of a portion of the surroundings.

In Example 19, the subject matter of Examples 13-18 includes, wherein the target location is located on a moving object, and wherein the operations further comprise sequentially activating motors of the plurality of independently moveable components to follow the moving object.

In Example 20, the subject matter of Examples 13-19 includes, wherein the first component includes a hexagonal surface initially in contact with the surface, wherein the one of the two other robotic components includes a pentagonal surface initially in contact with the surface, wherein the processing circuitry is located in a core of the robotic system, and wherein the first component is configured to plug into the core.

In Example 21, the subject matter of Examples 13-20 includes, wherein operations to determine the first robotic component to activate include operations to: identify a second set of robotic components of the plurality of independently moveable components, each of the second set of robotic components being adjacent to two components of the first set of robotic components; determine a reference component from the second set of three components that is closest to the target location using the information captured by the first camera, the reference component being adjacent to a second and a third components of the first set of robotic components; and wherein the second and the third components form the axis.

In Example 22, the subject matter of Example 21 includes, wherein the reference component includes the first camera.

In Example 23, the subject matter of Examples 21-22 includes, wherein after the robotic system moves, the reference component and the two other robotic components are in contact with the surface; and further comprising operations including determining a new reference component that is closest to the target location.

In Example 24, the subject matter of Examples 13-23 includes, wherein operations to determine the first robotic component to activate include operations to use a distance from a point on each of the first robotic component and the two other robotic components to the target location, and select the first robotic component based on the first robotic component corresponding to a shortest distance to the target location.

Example 25 is an autonomous robotic system comprising: a frame; a core device including processing circuitry and memory including instructions that when executed by the processing circuitry, cause the processing circuitry to determine distances to a target location; and a plurality of robotic components that are physically and communicatively coupled to the core device, the plurality of robotic components independently moveable and including a first robotic component to: activate, based on a determination that the first robotic component corresponds to a shortest distance among robotic components of the plurality of robotic components in contact with a surface, a motor of the first robotic component to push against the surface to cause the autonomous robotic system to pivot about an axis formed by two other robotic components of the plurality of robotic components towards the target location.

In Example 26, the subject matter of Example 25 includes, wherein the autonomous robotic system is configured to autonomously moves when a robotic component of the plurality of robotic components is removed or a motor is nonfunctional.

In Example 27, the subject matter of Examples 25-26 includes, wherein the core includes a global positioning system sensor, wherein each of the plurality of robotic components includes an inertial measurement unit, and wherein the processing circuitry is to perform error correction for an internal coordinate system using an average sensor value from each of the inertial measurement units.

In Example 28, the subject matter of Examples 25-27 includes, wherein each of the plurality of robotic components is locked in place via a locking mechanism when physically connected to the core, the locking mechanism controlled by the processing circuitry.

In Example 29, the subject matter of Examples 25-28 includes, wherein each of the plurality of robotic components include respective batteries and the core includes a battery; and wherein the autonomous robotic system is configured to include at least one of: wherein the core battery is configured to be charged via the respective batteries of the plurality of robotic components; wherein a battery of the respective batteries is configured to charge another battery of the respective batteries; or wherein one or more of the plurality of robotic components includes a charging port.

In Example 30, the subject matter of Examples 25-29 includes, wherein each of the plurality of robotic components includes a camera.

Example 31 is a robotic system having a plurality of independently moveable components, the robotic system comprising: processing circuitry; and memory including instructions for autonomous movement of the robotic system, which when executed by the processing circuitry, causes the processing circuitry to perform operations including: receiving, at processing circuitry of the robotic system, a target location; identifying a first set of robotic components of the plurality of independently moveable components in contact with a surface; determining, using the target location and information captured by a first camera of the robotic system, a first robotic component of the first set of robotic components to activate to cause the robotic system to move closer to the target location; and activating, based on the determination, a motor of the first robotic component to push, against the surface, to cause the robotic system to pivot about an axis formed by two other robotic components of the first set of robotic components towards the target location.

In Example 32, the subject matter of Example 31 includes, wherein activating the motor includes sending a control signal to cause the motor to turn a screw of the first robotic component, the screw turning causing an air bladder to inflate, the air bladder inflation causing a membrane to extend to push on the surface.

In Example 33, the subject matter of Examples 31-32 includes, operations including, before activating the motor, determining that a collision would not be caused by activating the motor of the first robotic component.

In Example 34, the subject matter of Examples 31-33 includes, wherein receiving the target location includes receiving location instructions via communications circuitry of the robotic system and using an internal coordinate system to identify the target location.

In Example 35, the subject matter of Examples 31-34 includes, operations including: capturing images using cameras of the plurality of independently moveable components of an object while the robotic system traverses a loop around the object to reach the target location; and generating a three-dimensional model of the object using the captured images.

In Example 36, the subject matter of Examples 31-35 includes, operations including: capturing images of an environment of the robotic system using cameras of the plurality of independently moveable components while the robotic system moves to the target location; and generating a depth image of a portion of the environment.

In Example 37, the subject matter of Examples 31-36 includes, wherein the target location is located on a moving object, and wherein the instructions, when executed, further cause the processing circuitry to sequentially activate motors of the plurality of independently moveable components to follow the moving object.

In Example 38, the subject matter of Examples 31-37 includes, wherein the first robotic component includes a hexagonal surface initially in contact with the surface, wherein the one of the two other robotic components includes a pentagonal surface initially in contact with the surface, wherein the processing circuitry is located in a core of the robotic system, and wherein the first robotic component is configured to removably couple with the core.

In Example 39, the subject matter of Examples 31-38 includes, wherein determining the first robotic component to activate includes: identifying a second set of robotic components of the plurality of independently moveable components, each of the second set of robotic components being adjacent to two components of the first set of robotic components; determining a reference component from the second set of three components that is closest to the target location using the information captured by the first camera, the reference component being adjacent to a second and a third components of the first set of robotic components; and wherein the second and the third components form the axis.

In Example 40, the subject matter of Example 39 includes, wherein the reference component includes the first camera.

In Example 41, the subject matter of Examples 39-40 includes, wherein after the robotic system moves, the reference component is in contact with the surface.

In Example 42, the subject matter of Examples 31-41 includes, wherein determining the first robotic component to activate includes using a distance from a point on each of the first robotic component and the two other robotic components to the target location, and selecting the first robotic component based on the first robotic component corresponding to a shortest distance to the target location.

Example 43 is at least one machine-readable medium including instructions that, when executed by processing circuitry, cause the processing circuitry to perform operations to implement of any of Examples 1-42.

Example 44 is an apparatus comprising means to implement of any of Examples 1-42.

Example 45 is a system to implement of any of Examples 1-42.

Example 46 is a method to implement of any of Examples 1-42.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A robotic system having a plurality of independently moveable components, the robotic system comprising:
    processing circuitry; and
    memory including instructions for autonomous movement of the robotic system, which when executed by the processing circuitry, causes the processing circuitry to perform operations including:
    receiving, at processing circuitry of the robotic system, a target location;
    identifying a first set of robotic components of the plurality of independently moveable components in contact with a surface;
    determining, using the target location and information captured by a first camera of the robotic system, a first robotic component of the first set of robotic components to activate to cause the robotic system to move closer to the target location; and
    activating, based on the determination, a motor of the first robotic component to push, against the surface, to cause the robotic system to pivot about an axis formed by two other robotic components of the first set of robotic components towards the target location, wherein after causing the robotic system to pivot about the axis, the first robotic component is no longer in contact with the surface.

2. The robotic system of claim 1, wherein activating the motor includes sending a control signal to cause the motor to turn a screw of the first robotic component, the screw turning causing an air bladder to inflate, the air bladder inflation causing a membrane to extend to push on the surface.

3. The robotic system of claim 1, further comprising operations including, before activating the motor, determining that a collision would not be caused by activating the motor of the first robotic component.

4. The robotic system of claim 1, wherein receiving the target location includes receiving location instructions via communications circuitry of the robotic system and using an internal coordinate system to identify the target location.

5. The robotic system of claim 1, further comprising operations including:
    capturing images using cameras of the plurality of independently moveable components of an object while the robotic system traverses a loop around the object to reach the target location; and
    generating a three-dimensional model of the object using the captured images.

6. The robotic system of claim 1, further comprising operations including:
    capturing images of an environment of the robotic system using cameras of the plurality of independently moveable components while the robotic system moves to the target location; and generating a depth image of a portion of the environment.

7. The robotic system of claim 1, wherein the target location is located on a moving object, and wherein the operations further comprise sequentially activating motors of the plurality of independently moveable components to follow the moving object.

8. The robotic system of claim 1, wherein the first robotic component includes a hexagonal surface initially in contact with the surface, wherein the one of the two other robotic components includes a pentagonal surface initially in contact with the surface, wherein the processing circuitry is located in a core of the robotic system, and wherein the first robotic component is configured to removably couple with the core.

9. The robotic system of claim 1, wherein determining the first robotic component to activate includes:
identifying a second set of robotic components of the plurality of independently moveable components;
determining a reference component from the second set of three components that is closest to the target location using the information captured by the first camera, the reference component being adjacent to a second and a third components of the first set of robotic components; and
wherein the second and the third components form the axis.

10. The robotic system of claim 9, wherein the reference component includes the first camera.

11. The robotic system of claim 9, wherein after the robotic system moves, the reference component and the two other robotic components are in contact with the surface; and
further comprising operations including determining a new reference component that is closest to the target location.

12. The robotic system of claim 1, wherein determining the first robotic component to activate includes using a distance from a point on each of the first robotic component and the two other robotic components to the target location, and selecting the first robotic component based on activating the first robotic component causing the robotic system to initiate traversal of a shortest distance to the target location.

13. A non-transitory machine-readable medium including instructions for autonomous movement of a robotic system having a plurality of independently moveable components, which when executed by processing circuitry of the robotic system, cause the processing circuitry to perform operations to:
obtain a target location;
identify a first set of robotic components of the plurality of independently moveable components in contact with a surface;
determine, using the target location and information captured by a first camera of the robotic system, a first robotic component of the first set of robotic components to activate to cause the robotic system to move closer to the target location; and
activate, based on the determination, a motor of the first robotic component to push, against the surface, to cause the robotic system to pivot about an axis formed by two other robotic components of the first set of robotic components towards the target location, wherein after causing the robotic system to pivot about the axis, the first robotic component is not in contact with the surface.

14. The machine-readable medium of claim 13, wherein operations to activate the motor include operations to send a control signal to cause the motor to turn a screw of the first robotic component, the screw turning causing an air bladder to inflate, the air bladder inflation causing a membrane to extend to push on the surface.

15. The machine-readable medium of claim 13, wherein before activating the motor, the instructions, when executed, cause the processing circuitry to determine that a collision would not be caused by activating the motor of the first robotic component.

16. The machine-readable medium of claim 13, wherein operations to receive the target location include operations to receive location instructions via communications circuitry of the robotic system and use an internal coordinate system to identify the target location.

17. The machine-readable medium of claim 13, wherein the instructions, when executed, cause the processing circuitry to:
capture images using cameras of the plurality of independently moveable components of an object while the robotic system traverses a loop around the object to reach the target location; and
generate a three-dimensional model of the object using the captured images.

18. The machine-readable medium of claim 13, wherein the instructions, when executed, cause the processing circuitry to:
capture images of an environment of the robotic system using cameras of the plurality of independently moveable components while the robotic system moves to the target location; and
generate a depth image of a portion of the environment.

19. The machine-readable medium of claim 13, wherein the target location is located on a moving object, and wherein the instructions, when executed, further cause the processing circuitry to sequentially activate motors of the plurality of independently moveable components to follow the moving object.

20. The machine-readable medium of claim 13, wherein the first robotic component includes a hexagonal surface initially in contact with the surface, wherein the one of the two other robotic components includes a pentagonal surface initially in contact with the surface, wherein the processing circuitry is located in a core of the robotic system, and wherein the first robotic component is configured to removably couple with the core.

21. The machine-readable medium of claim 13, wherein operations to determine the first robotic component to activate include operations to:
identify a second set of robotic components of the plurality of independently moveable components;
determine a reference component from the second set of three components that is closest to the target location using the information captured by the first camera, the reference component being adjacent to a second and a third components of the first set of robotic components; and
wherein the second and the third components form the axis.

22. The machine-readable medium of claim 21, wherein the reference component includes the first camera.

23. The machine-readable medium of claim 21, wherein after the robotic system moves, the reference component is in contact with the surface.

24. The machine-readable medium of claim 13, wherein operations to determine the first robotic component to activate include operations to use a distance from a point on each of the first robotic component and the two other robotic components to the target location, and select the first robotic component based on activating the first robotic component causing the robotic system to initiate traversal of a shortest distance to the target location.

25. An autonomous robotic system comprising:
   a frame;
   a core device including processing circuitry and memory including instructions that when executed by the processing circuitry, cause the processing circuitry to determine distances to a target location; and
   a plurality of robotic components that are physically and communicatively coupled to the core device, the plurality of robotic components independently moveable and including a first robotic component to:
   activate, based on a determination that activating the first robotic component corresponds to causing the autonomous robotic system to initiate traversal of a shortest distance toward the target location among robotic components of the plurality of robotic components in contact with a surface, a motor of the first robotic component to push against the surface to cause the autonomous robotic system to pivot about an axis formed by two other robotic components of the plurality of robotic components towards the target location, wherein after causing the autonomous robotic system to pivot about the axis, the first robotic component is no longer in contact with the surface.

\* \* \* \* \*